(12) United States Patent
Hashimoto

(10) Patent No.: US 8,724,071 B2
(45) Date of Patent: May 13, 2014

(54) LIQUID CRYSTAL DISPLAY DEVICE

(75) Inventor: Yoshiaki Hashimoto, Kanagawa (JP)

(73) Assignee: NLT Technologies, Ltd., Kanagawa (JP)

( * ) Notice: Subject to any disclaimer, the term of this patent is extended or adjusted under 35 U.S.C. 154(b) by 1224 days.

(21) Appl. No.: 12/613,031

(22) Filed: Nov. 5, 2009

(65) Prior Publication Data

US 2010/0118254 A1 May 13, 2010

(30) Foreign Application Priority Data

Nov. 11, 2008 (JP) ................................ 2008-288400

(51) Int. Cl.
*G02F 1/1339* (2006.01)

(52) U.S. Cl.
USPC .......................................... 349/156; 349/122

(58) Field of Classification Search
USPC ............................. 349/155, 156, 122, 157, 42
See application file for complete search history.

(56) References Cited

U.S. PATENT DOCUMENTS

| | | | |
|---|---|---|---|
| 7,502,090 B2 | 3/2009 | Oh et al. | |
| 7,561,245 B2 | 7/2009 | Oh et al. | |
| 2005/0185130 A1 | 8/2005 | Oh et al. | |
| 2006/0055863 A1* | 3/2006 | Sawasaki et al. | 349/156 |
| 2006/0256274 A1* | 11/2006 | Johgan et al. | 349/155 |
| 2006/0290860 A1* | 12/2006 | Lee | 349/139 |
| 2006/0290873 A1* | 12/2006 | Yang et al. | 349/156 |
| 2007/0085967 A1* | 4/2007 | Park et al. | 349/156 |
| 2007/0132936 A1* | 6/2007 | Lee et al. | 349/156 |
| 2007/0188697 A1 | 8/2007 | Oh et al. | |

FOREIGN PATENT DOCUMENTS

| | | |
|---|---|---|
| JP | 2003-279997 | 10/2003 |
| JP | 2004-341214 | 12/2004 |
| JP | 2005-189662 | 7/2005 |
| JP | 2005-242297 | 9/2005 |
| JP | 2007-164129 | 6/2007 |

OTHER PUBLICATIONS

Japanese Office Action dated Feb. 22, 2013 in corresponding Japanese Patent Application No. 2008-288400 with English translation of concise explanation of relevance.

* cited by examiner

*Primary Examiner* — Dung Nguyen
*Assistant Examiner* — Tai Duong
(74) *Attorney, Agent, or Firm* — Young & Thompson

(57) ABSTRACT

A liquid crystal display device includes a TFT substrate, a counter substrate, more than one columnar spacer formed on the counter substrate side, a step film of convex shape formed onto the TFT substrate side and arranged at a position facing the columnar spacer, and a liquid crystal sealed between the TFT substrate and the counter substrate, wherein a difference between a central coordinate of the step film and a central coordinate of the columnar spacer seen in a normal direction of a display surface of the liquid crystal display device varies with standard deviation $\sigma$ of no smaller than 3 µm in at least one direction within an appropriate range in a display area of the display surface.

24 Claims, 28 Drawing Sheets

100: TFT SUBSTRATE
101: GLASS SUBSTRATE
102: GATE LINE
103: COM WIRING
104: COM ELECTRODE
105: GATE INSULATION FILM
106: a-Si LAYER
107: DRAIN LINE
108: PIXEL ELECTRODE
109: STEP FILM
110: PASSIVATION FILM
200: COUNTER SUBSTRATE
201: GLASS SUBSTRATE
202: BM
203: COLOR LAYER
204: OC
205: COLUMNAR SPACER
206: LIQUID CRYSTAL

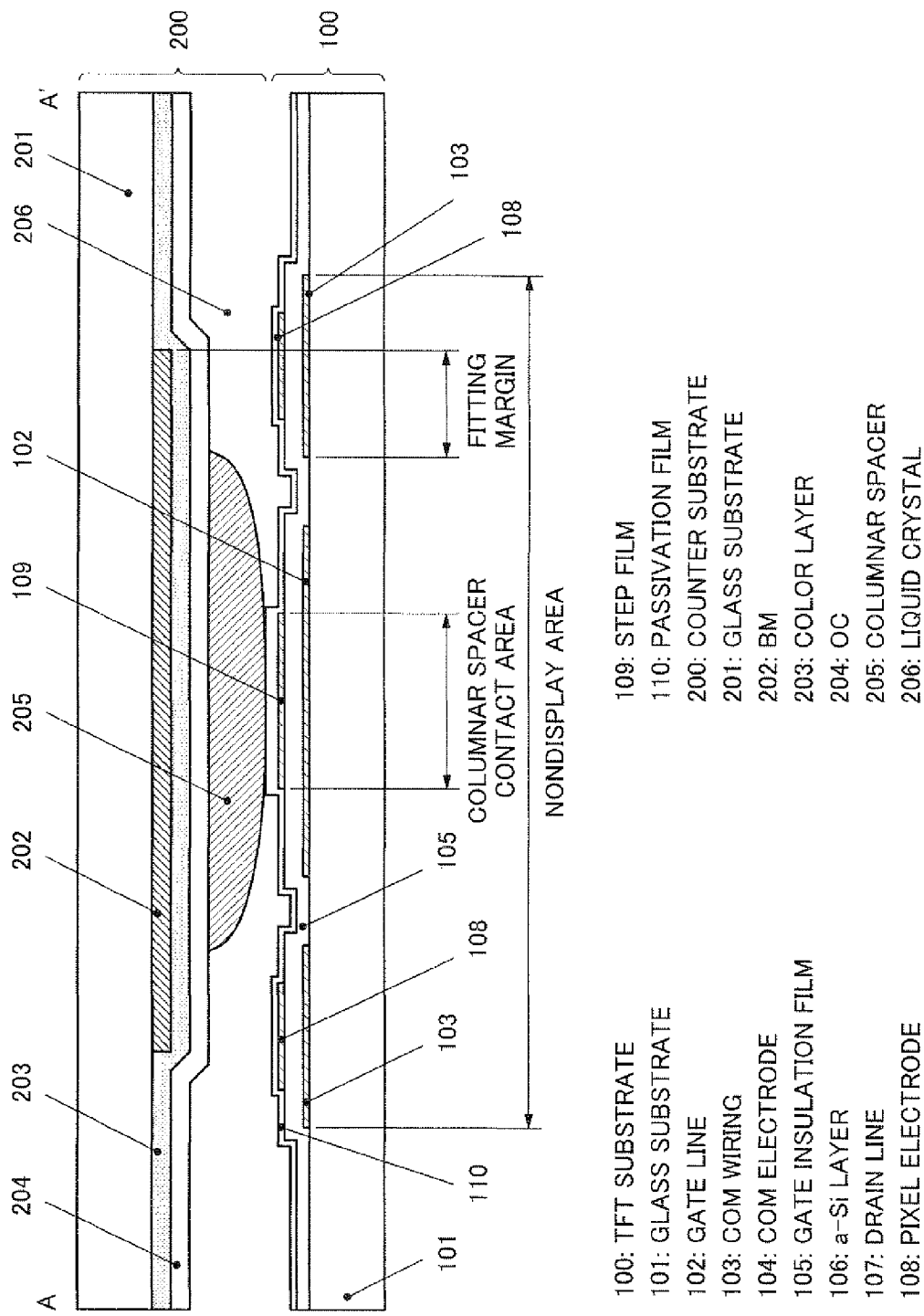

COLUMNAR SPACER 205a
(WITH A STEP FILM IN THE TFT SIDE)

COLUMNAR SPACER 205b
(WITHOUT A STEP FILM IN THE TFT SIDE)

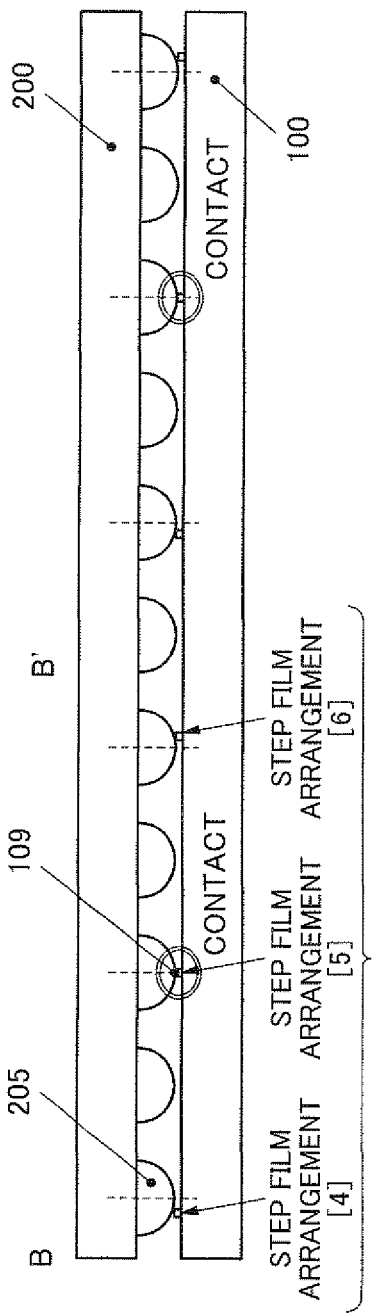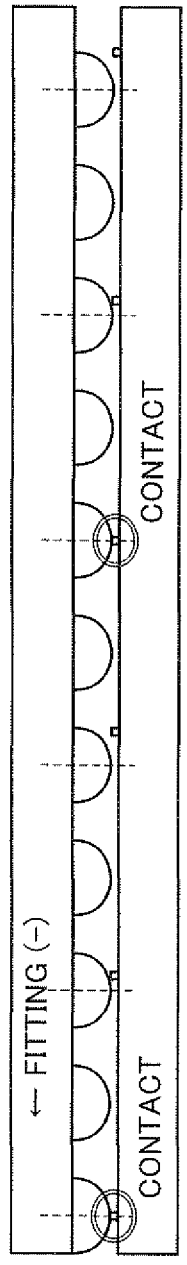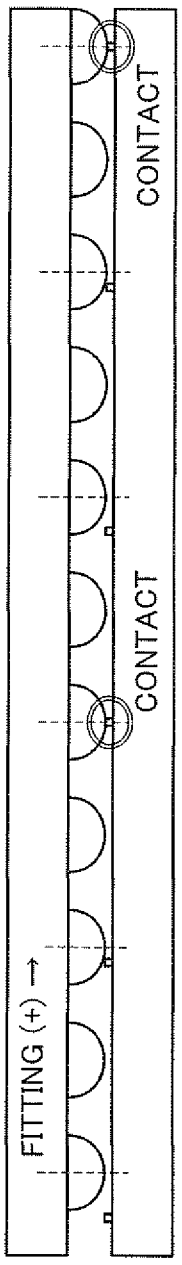

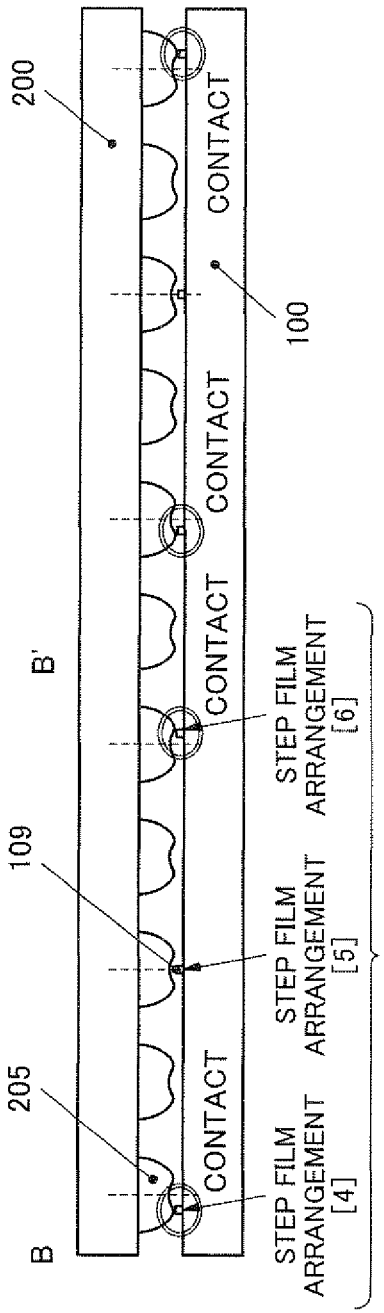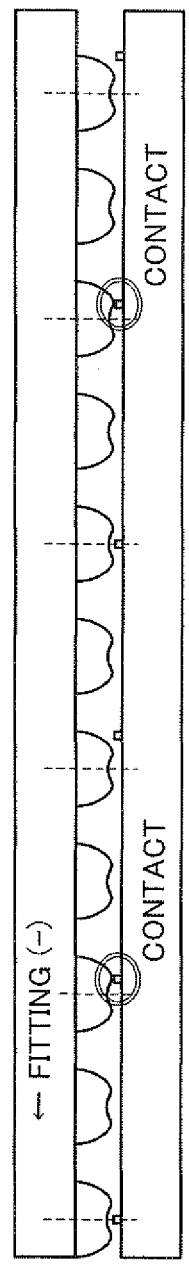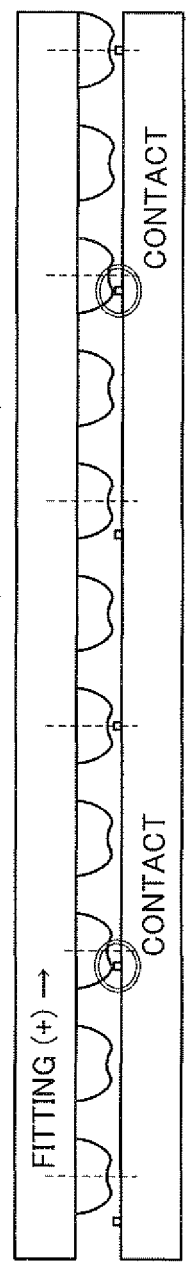

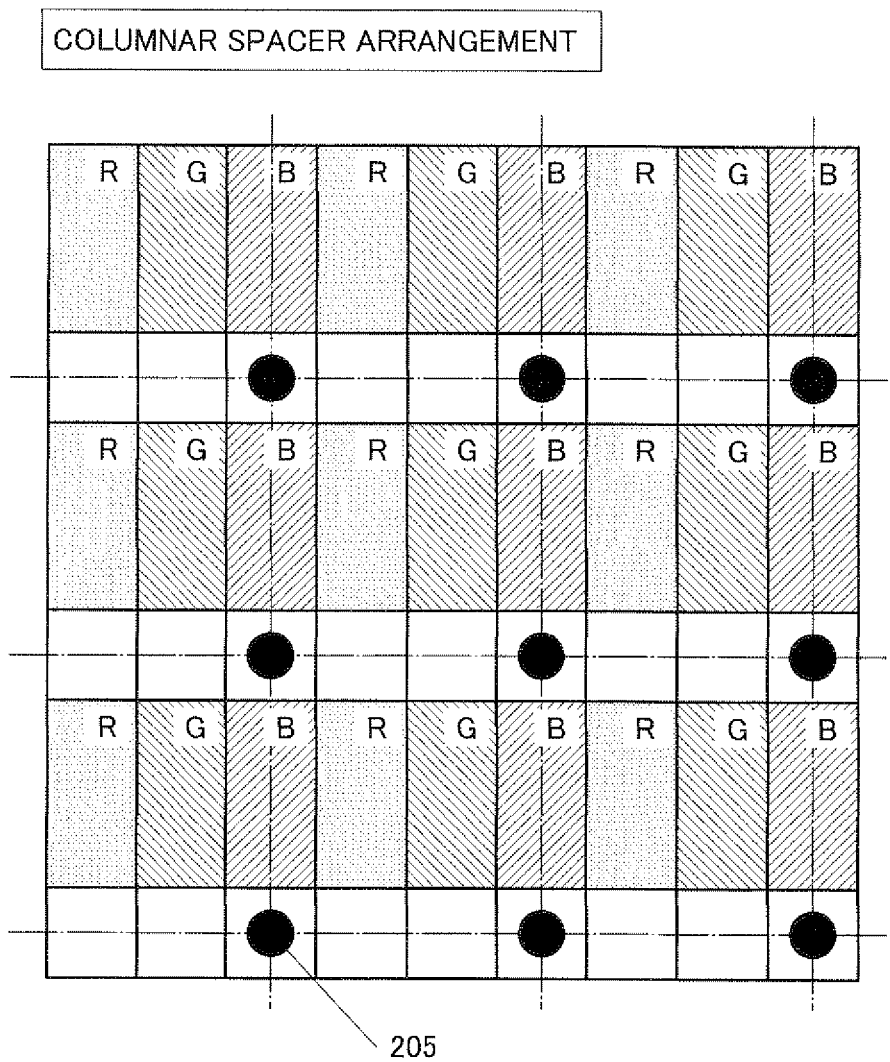

LIQUID CRYSTAL DISPLAY DEVICE

This application is based upon and claims the benefit of priority from Japanese Patent Application No. 2008-288400, filed on Nov. 11, 2008, the disclosure of which is incorporated herein in its entirety by reference.

TECHNICAL FIELD

The present invention relates to a liquid crystal display device.

BACKGROUND ART

In a liquid crystal display panel, a TFT (Thin Film Transistor) substrate and a counter substrate are often supported by a spherical spacer or a columnar spacer arranged between them. As a result, a predetermined thickness of a liquid crystal layer (henceforth, referred to as a cell gap) is obtained.

When a spherical spacer is used, the fixing characteristic between the spacer and the substrates is weak. Therefore, in a liquid crystal display device in which the cell gap is supported by spherical spacers, the spherical spacers are easily moved by a vibration such as when it is transported. Moving of the spherical spacers causes an indication defect such as a leak of light, degradation of contrast and lack of uniformity of the cell gap. A spherical spacer arranged in an indication area causes an alignment defect in its peripheral part. As a result, degradation of contrast occurs.

Moreover, for a liquid crystal display panel or the like supporting an animation, fast response is required. One of means to realize fast response is to make a cell gap small. However, in order to form a cell gap which is sufficiently small, a spherical spacer whose grain diameter is small and whose variation in the grain size is small is needed. Acquisition of such spherical spacer is not easy.

On the other hand, in the case of a liquid crystal display device in which a columnar spacer is arranged in a light shielding portion, the problem that a spacer is moved by a vibration and the like does not occur. This is because a columnar spacer is fixed on a CF substrate firmly. Moreover, by arranging a columnar spacer in a light shielding portion, contrast of a panel also improves. A columnar spacer can be made short sufficiently compared with a spherical spacer. Therefore, along with requirements for a liquid crystal display device with higher contrast and a faster response in recent years, products using a columnar spacer are increasing.

However, when external stress such as rubbing the panel surface is added to a panel using a columnar spacer, the following problem occurs. That is, a columnar spacer fixed on either one of substrates is moved by glide motion on the surface of the other substrate facing the former.

A columnar spacer generally forms a cell gap in the state that it is compressed by several %. Therefore, a force is always added between the surface of a columnar spacer and the surface of a substrate which the columnar spacer touches. Even when a force added from outside disappears, it is often difficult to return to the original state because of friction of the surface of the substrate which the columnar spacer touches. In this case, a stress remains in the two substrates facing each other. Therefore, there occurs a problem that light leak is caused in a black screen.

A liquid crystal display device shown in FIG. 16 is disclosed in Japanese Patent Application Laid-open Publication No. 2005-242297. In the liquid crystal display device shown in FIG. 16, a convex step film is formed onto a position corresponding to a columnar spacer.

SUMMARY

An exemplary object of the invention is to provide a liquid crystal display device which can suppress nonuniformity of a cell gap even when misalignment between a TFT substrate and a counter substrate and a variation in the shape of columnar spacers occur.

A liquid crystal display device according to an exemplary aspect of the invention includes a TFT substrate, a counter substrate, more than one columnar spacer formed on the counter substrate side, a step film of convex shape formed onto the TFT substrate side and arranged at a position facing the columnar spacer, and a liquid crystal sealed between the TFT substrate and the counter substrate, wherein a difference between a central coordinate of the step film and a central coordinate of the columnar spacer seen in a normal direction of a display surface of the liquid crystal display device varies with standard deviation $\sigma$ of no smaller than 3 μm in at least one direction within an appropriate range in a display area of the display surface.

BRIEF DESCRIPTION OF THE DRAWINGS

Exemplary features and advantages of the present invention will become apparent from the following detailed description when taken with the accompanying drawings in which:

FIG. 3 is a sectional view showing the structure of a panel taken along line A-A' of FIG. 2;

FIGS. 5A-C are sectional views taken along line B-B' of FIGS. 4A, B showing the structure of the panel, which indicates contact states of columnar spacers whose tips are of convex shape with step films;

FIGS. 6A-C are sectional views taken along line B-B' of FIGS. 4A, B showing the structure of the panel, which indicates contact states of columnar spacers whose tips are of concave shape with step films;

FIG. 9A is a schematic diagram showing the repeat pattern of columnar spacers of a fifth exemplary embodiment of the present invention;

EXEMPLARY EMBODIMENT

The First Exemplary Embodiment

Figure 16:
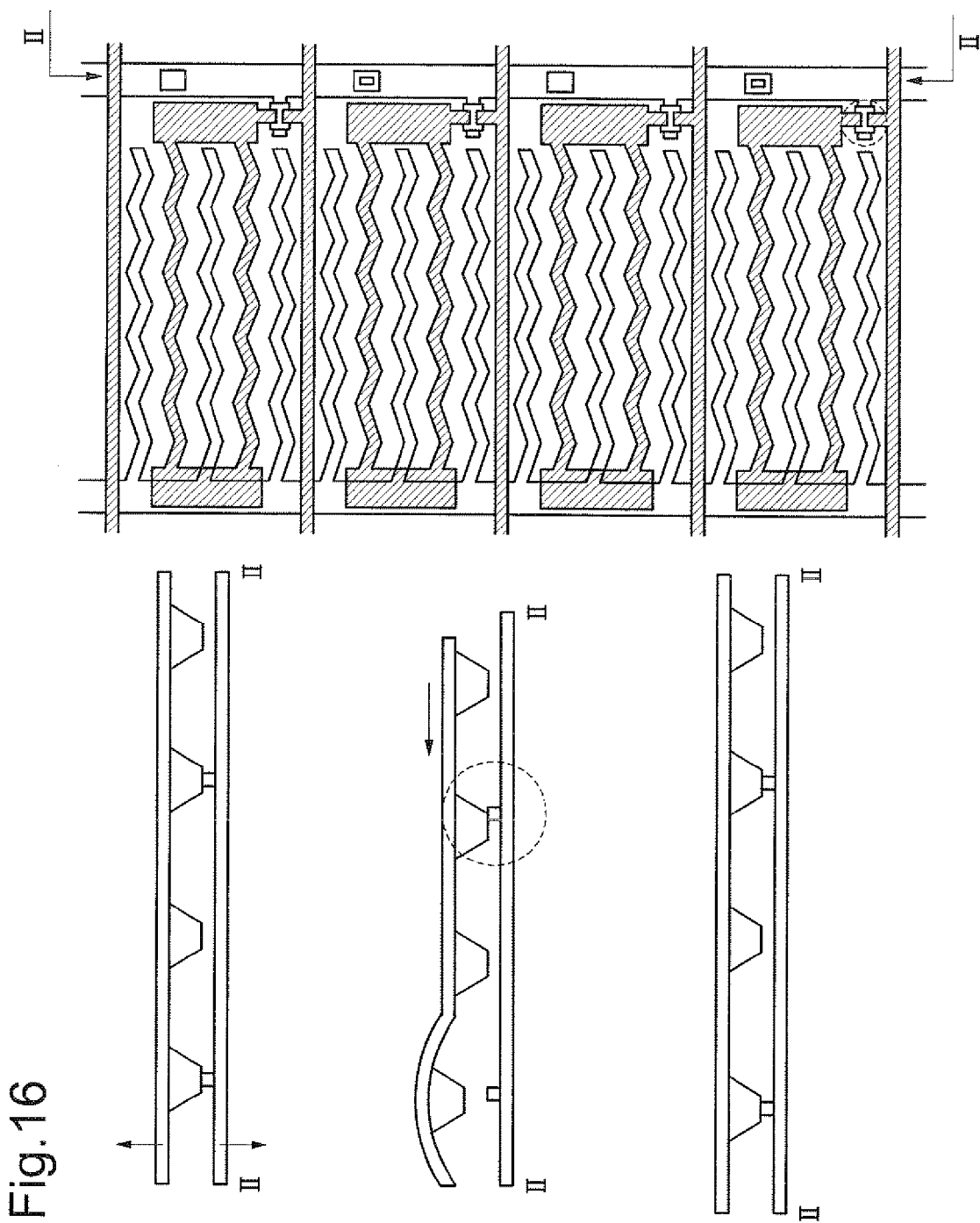
FIG. 16 is a sectional view and a plan view showing the structure of a liquid crystal display device related to the present invention.

As indicated in the section of BACKGROUND ART, in Japanese Patent Application Laid-open Publication No. 2005-242297 discloses a liquid crystal display device in which a convex step film is formed onto a position corresponding to a columnar spacer as shown in FIG. 16.

However, in the liquid crystal display device shown in FIG. 16, there is a problem related to a convex step film. This problem is caused by the fact that the shape of the tip portion of a columnar spacer formed is not flat necessarily.

Figure 17:
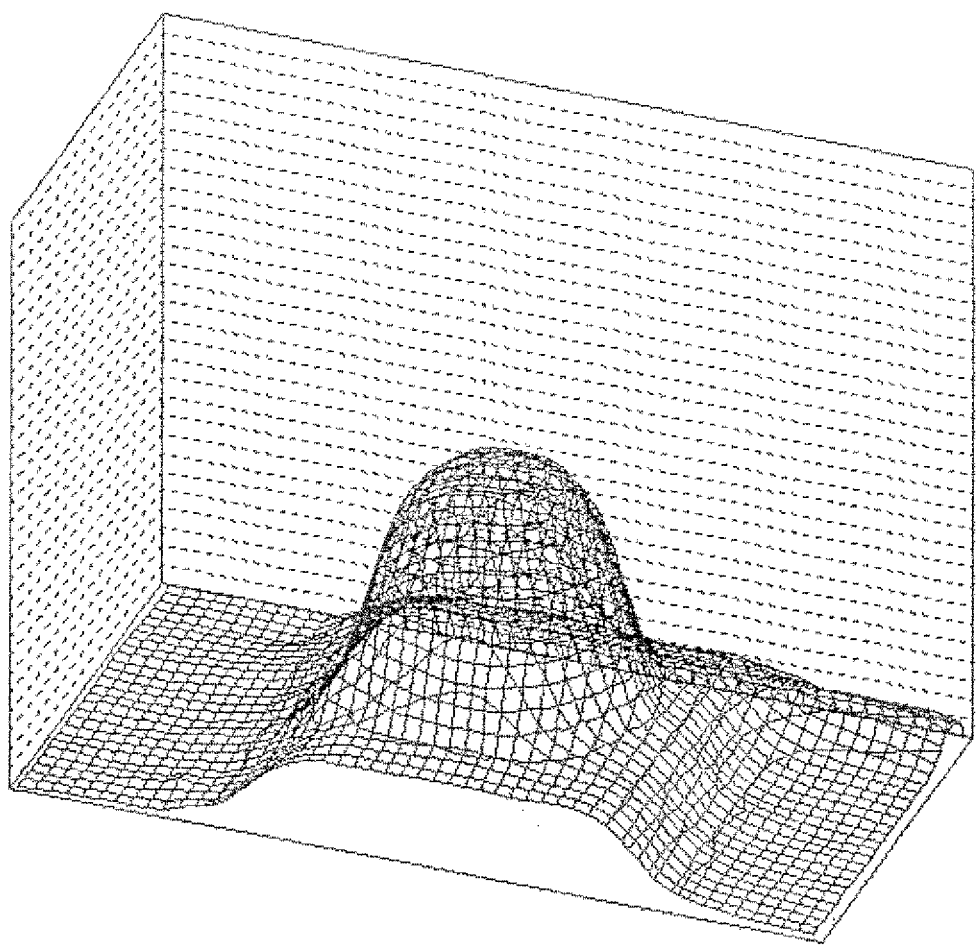
FIG. 17 is a perspective view showing an example of the shape of a columnar spacer.

An example of the shape of a columnar spacer is shown in FIG. 17. This columnar spacer has the shape with a gentle curve in which the midsection may become highest. Therefore, a flat portion does not exist in the tip part of the columnar spacer. As another example of the shape of a columnar spacer, there is a columnar spacer which has a concave shape in which the midsection is dented. The shape of a columnar spacer like these is influenced by conditions of each step of forming the columnar spacer and the shape or the like of the foundation in addition to the characteristics of the material of the columnar spacer.

Figure 18:
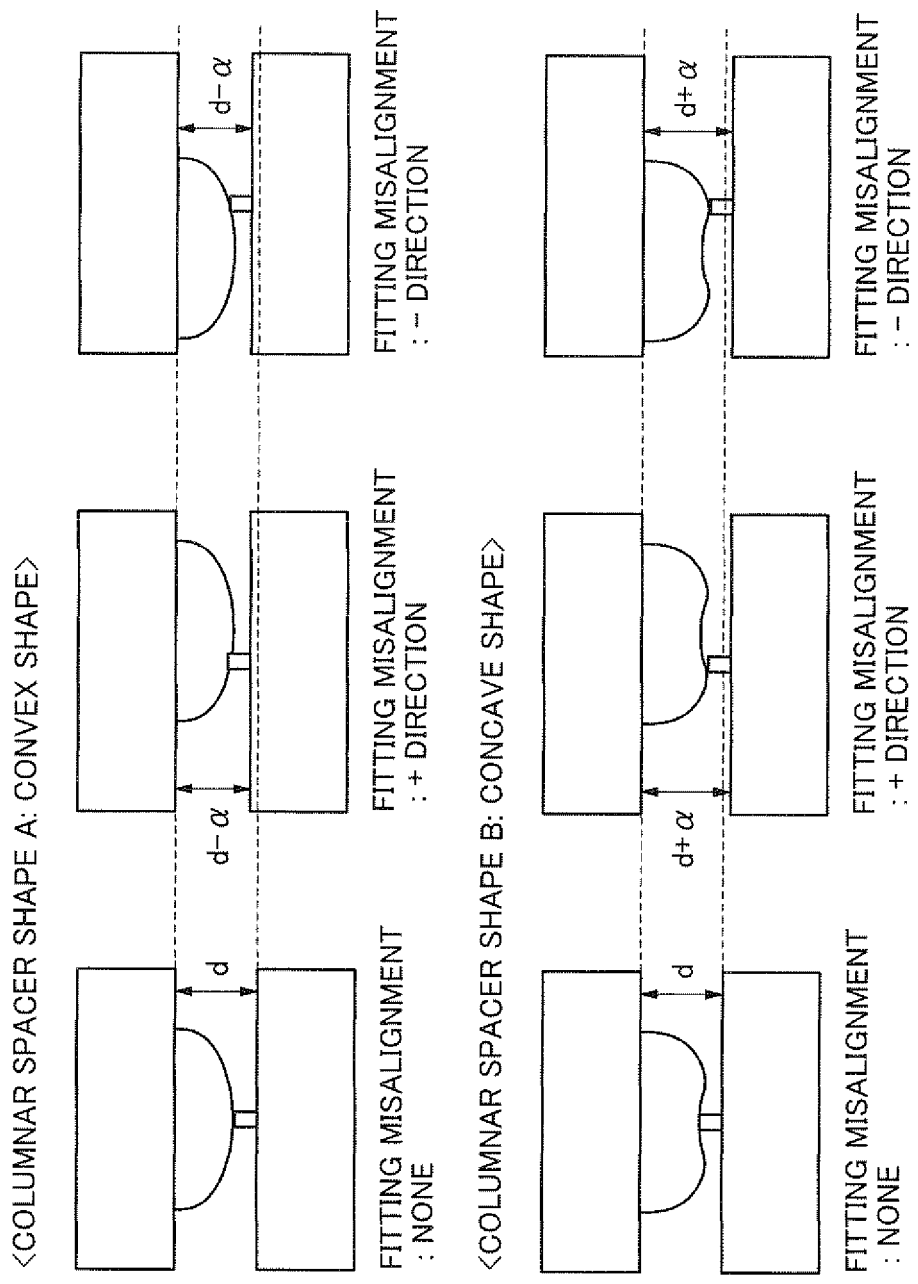
FIG. 18 is a diagram showing the structure of a liquid crystal display device related to the present invention.

A problem which occurs when a convex step film smaller than a columnar spacer make contact with the tip part of the columnar spacer which is not flat will be described with reference to FIG. 18.

First, the case where the midsection of the tip of a columnar spacer is the highest portion like columnar spacer shape A (a convex shape) will be described. In this case, when there are no misalignment between the TFT substrate and the counter substrate, the midsection of the columnar spacer and the midsection of the step film are in contact with each other. Therefore, the cell gap of a specified gap value (d) is obtained (refer to the figure in upper left). However, when there is a misalignment between the TFT substrate and the counter substrate, the step film is not in contact with the vertex part of the columnar spacer, but instead in contact with a tapered portion. Therefore, the gap value of the cell gap becomes smaller than the specified gap value (d), that is, d−α (refer to the figures in upper center and upper right).

Next, the case where the midsection of a columnar spacer dents like columnar spacer shape B (a concave shape) will be described. In this case, when there is no misalignment between the TFT substrate and the counter substrate, the midsection of a step film is in contact with the concave part in the midsection of a columnar spacer. Therefore, the cell gap with the specified gap value (d) can be obtained (refer to the figure in lower left). However, when there is a misalignment between the TFT substrate and the counter substrate, the step film is in contact with a part higher than the midsection of the columnar spacer which is dented. Therefore, the gap value of the cell gap becomes d+α which is larger than the specified gap value (d) (refer to the figures in lower center and lower right).

By non-uniformity of luminous exposure, variation in liquid flow in development and variation in the firing temperature and the like, the shape of a columnar spacer may become non-uniform in the panel surface. When variation occurs in the columnar spacer shape as mentioned above, and if misalignment occurs, the contact positions of columnar spacers and the step films vary. As a result, nonuniformity occurs in the cell gap, causing unevenness in luminance.

In order for a step film to touch only a flat part in the tip part of a columnar spacer, the columnar spacer needs to be made in the following shape. That is, it is necessary to make the area of a columnar spacer large sufficiently, considering variation in the shape of the tip part. In addition, the area of the flat part in the tip part of a columnar spacer needs to be made large. On the one hand, in order to shield light leaked by an alignment defect around a columnar spacer, the black matrix (BM) in a portion at which the columnar spacer is arranged needs to be made large. Therefore, when a columnar spacer wider than a BM is arranged on the BM, reduction of an aperture ratio is caused. Moreover, by an alignment defect around a columnar spacer, degradation of contrast occurs.

Additionally, as a means to suppress nonuniformity of a cell gap caused by the difference in contact portions of a columnar spacer and a step film, there is a method to form a step film which is of sufficiently large compared to a columnar spacer. In this case, even if there is a misalignment, a step film will support the highest part of a columnar spacer. Therefore, a cell gap which is uniform can be obtained. However, also in this method, reduction of an aperture ratio occurs as a result of making the area of the step film large.

Figure 1:
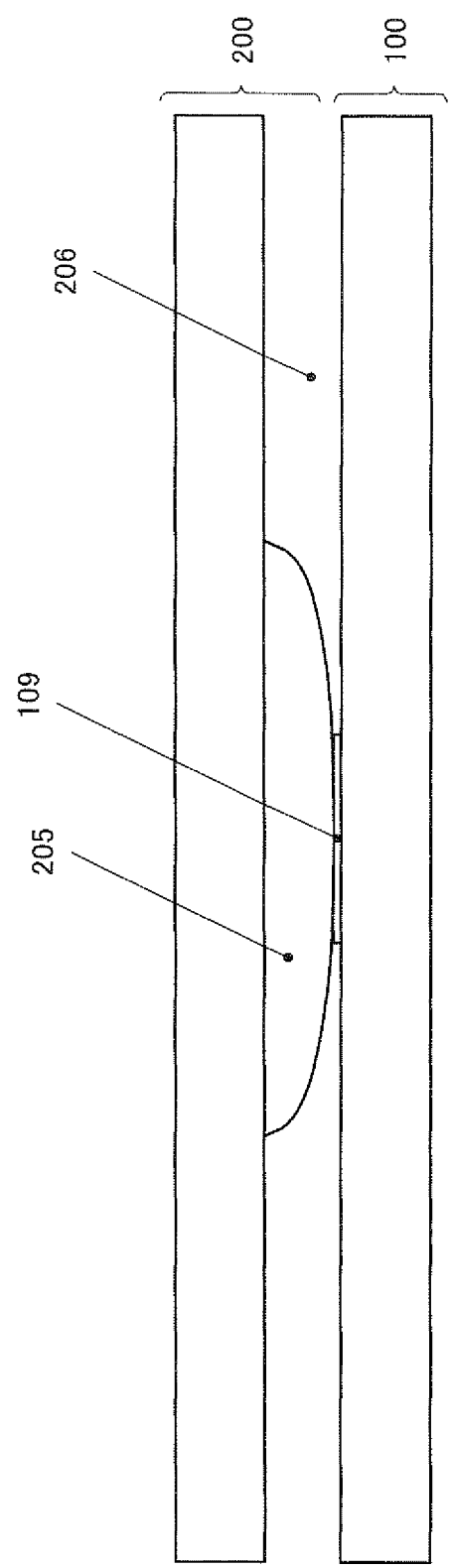
FIG. 1 is a diagram showing the structure of a liquid crystal display device according to a first exemplary embodiment of the present invention.

Accordingly, a liquid crystal display device in this exemplary embodiment has the construction shown in FIG. 1. That is, a liquid crystal display device in this exemplary embodiment has TFT substrate 100, step film 109, counter substrate 200, columnar spacer 205 and liquid crystal 206.

Step film 109 is formed on the TFT substrate side that is arranged in a position facing the columnar spacer. When seen in the normal direction of the display surface of the liquid crystal display device, the size of the step film 109 is smaller than the columnar spacer 205 in at least one direction. More than one columnar spacer 205 is formed onto the counter substrate. The liquid crystal 206 is sealed between the TFT substrate and the counter substrate.

A positional shift between the central coordinate of the step film 109 and the central coordinate of the columnar spacer 205 seen in the normal direction of the display surface of the liquid crystal display device has a variation with standard deviation σ of no smaller than 3 μm in at least one direction within an appropriate range in the display area of the display surface.

When described using an arrangement pitch of a step film and a columnar spacer, it is as follows. That is, the arrangement pitch of at least one of a step film and a columnar spacer varies with standard deviation σ of no smaller than 3 μm in at least one direction within the appropriate range in the display area of the display surface of the liquid crystal display device.

As a result, even if a misalignment occurs between the TFT substrate 100 and the counter substrate 200, and if there is a variation in the shape of the columnar spacer 205, occurrence of nonuniformity of a cell gap can be suppressed.

Alternatively, arrangement of at least one of a step film and a columnar spacer may be designed so that it may varies with standard deviation σ of no smaller than 3 μm in the direction perpendicular to an appropriate line in at least one direction within the appropriate range in the display area of the display surface of the liquid crystal display device.

Also in the case of this structure, even if a misalignment occurs between the TFT substrate 100 and the counter substrate 200, and if the shape of the columnar spacer 205 varies, occurrence of nonuniformity of a cell gap can be suppressed.

The Second Exemplary Embodiment

Next, the structure of a liquid crystal display device according to the second exemplary embodiment of the present invention will be described with reference to from FIG. 2 to FIG. 6A-C.

Figure 2:
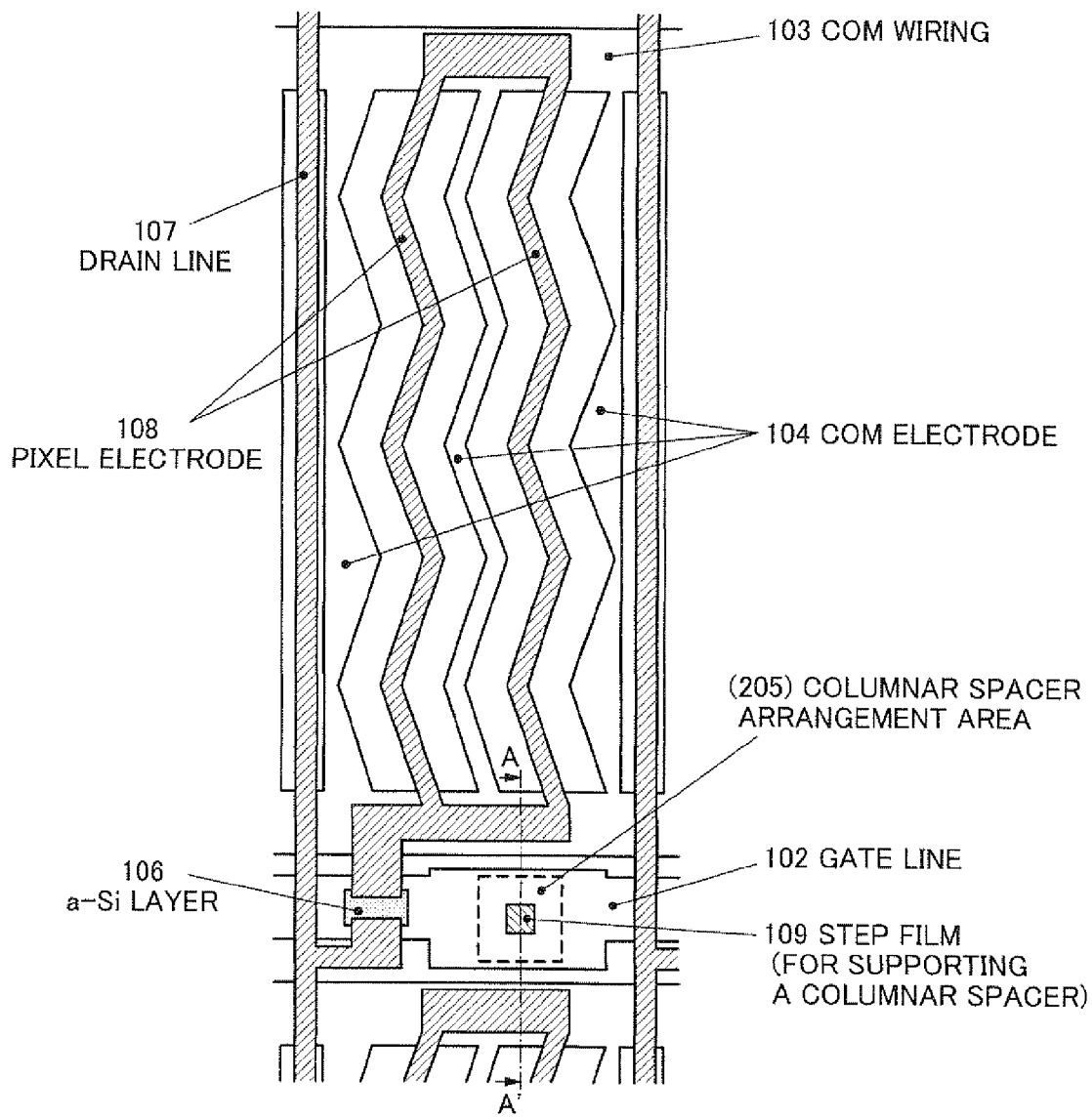
FIG. 2 is a plan view showing the structure of one pixel of the TFT substrate of a liquid crystal display device according to a second exemplary embodiment of the present invention.
Figure 4A:
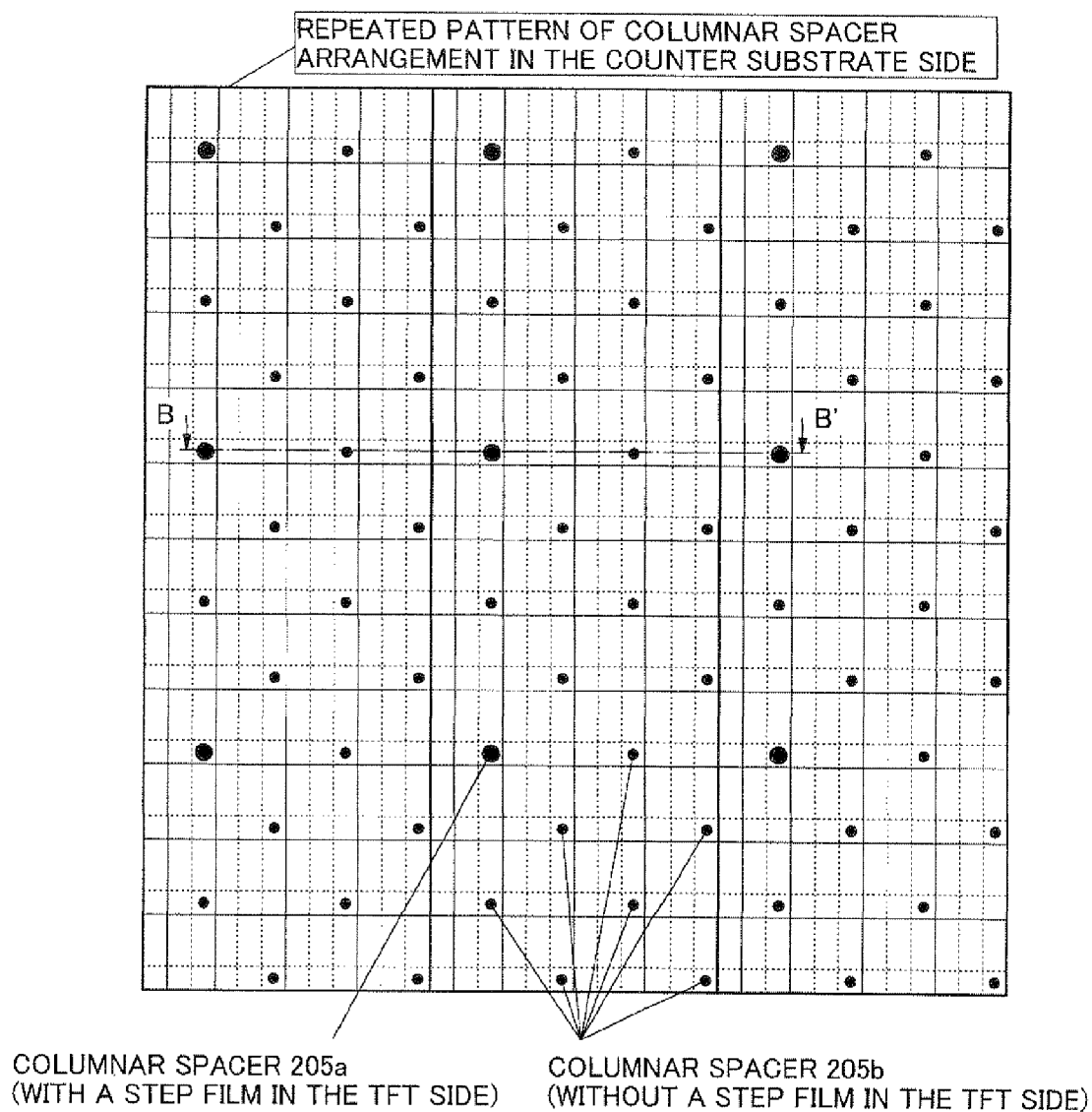
FIGS. 4A, B are schematic illustrations showing columnar spacers and the repeat pattern of step films of a liquid crystal display device according to the second exemplary embodiment of the present invention.

FIG. 2 is a plan view showing the structure of one pixel of a TFT substrate of this exemplary embodiment. FIG. 3 is a sectional view showing the structure of a panel taken along line A-A' of FIG. 2. FIGS. 4A, B is a schematic illustration showing repeat patterns of a columnar spacer and the step film of this exemplary embodiment. FIGS. 5A-C and FIGS. 6A-C are sectional views showing the structure of the panel taken along line B-B' of FIGS. 4A, B.

As shown in FIG. 2 and FIG. 3, a liquid crystal display device of this exemplary embodiment is provided with at least the TFT substrate 100, the counter substrate 200 and the liquid crystal 206 sandwiched between these two substrates.

The TFT substrate 100 includes, for example, a glass substrate 101, a gate line 102, a COM wiring 103, a COM electrode 104, a gate insulation film 105, an a-Si layer 106, a drain line 107 and a pixel electrode 108, a convex step film 109 and a passivation film 110.

The gate line 102, the COM wiring 103 and the COM electrode 104 are formed in the same layer on the glass substrate 101.

The gate insulation film 105 covers the surfaces of the gate line 102, the COM wiring 103 and the COM electrode 104.

The a-Si layer 106 is formed like an island on the gate insulation film 105.

The drain line 107 is formed on the gate insulation film 105 or the a-Si layer 106 and is orthogonal to the gate line 102.

The pixel electrode 108 and the drain line 107 are formed in the same layer.

The convex step film 109 and the drain line 107 are formed in the same layer. The convex step film 109 is arranged in a position where it can be in contact with a columnar spacer formed over the gate line 102.

The passivation film 110 covers the surfaces of the drain line 107, the pixel electrode 108 and the step film 109.

The counter substrate 200 includes, for example, a glass substrate 201, a BM 202, a color layer 203, an overcoat (henceforth, referred to as OC) 204 and a columnar spacer 205.

The BM 202 is a light shield film formed on the glass substrate 201.

The color layer 203 is formed so that the BM 202 and a transparent part where BM is not arranged may be covered.

The OC 204 is formed so that the color layer 203 may be covered.

The columnar spacer 205 is formed on the OC 204 and over the BM 202. The columnar spacer 205 is arranged in a position where it can be in contact with the step film 109 formed on the TFT substrate 100.

Hereinafter, the configuration of the step film 109 which is convex and the columnar spacer 205 will be described in detail.

Positional Relationship in Arrangement

First, the arrangement positional relationship between the convex step film 109 and the columnar spacer 205 will be described using FIGS. 4A, B.

FIG. 4A indicates a repeated arrangement of the columnar spacer 205 to be arranged on the counter substrate 200 according to this exemplary embodiment.

It is desirable to arrange the columnar spacer 205 to be arranged on the counter substrate 200 at portions of an identical color layer. In this exemplary embodiment, the columnar spacer 205 is arranged for every two pixels in a zigzag state over the BM 202 corresponding to the blue color layer. The columnar spacer 205 includes a columnar spacer 205a and a columnar spacer 205b. The columnar spacer 205a is arranged at a position corresponding to the step film 109 formed onto the TFT substrate 100. The columnar spacer 205b is arranged at a position without the step film 109. Further, the columnar spacer 205a is arranged for every 16 pixels (4 pixels×4 pixels). The columnar spacer 205a and the 205b arranged on the counter substrate 200 has a structure in which they are arranged in the whole panel surface repeatedly making an area of 4 pixels×4 pixels one unit.

Figure 4B:
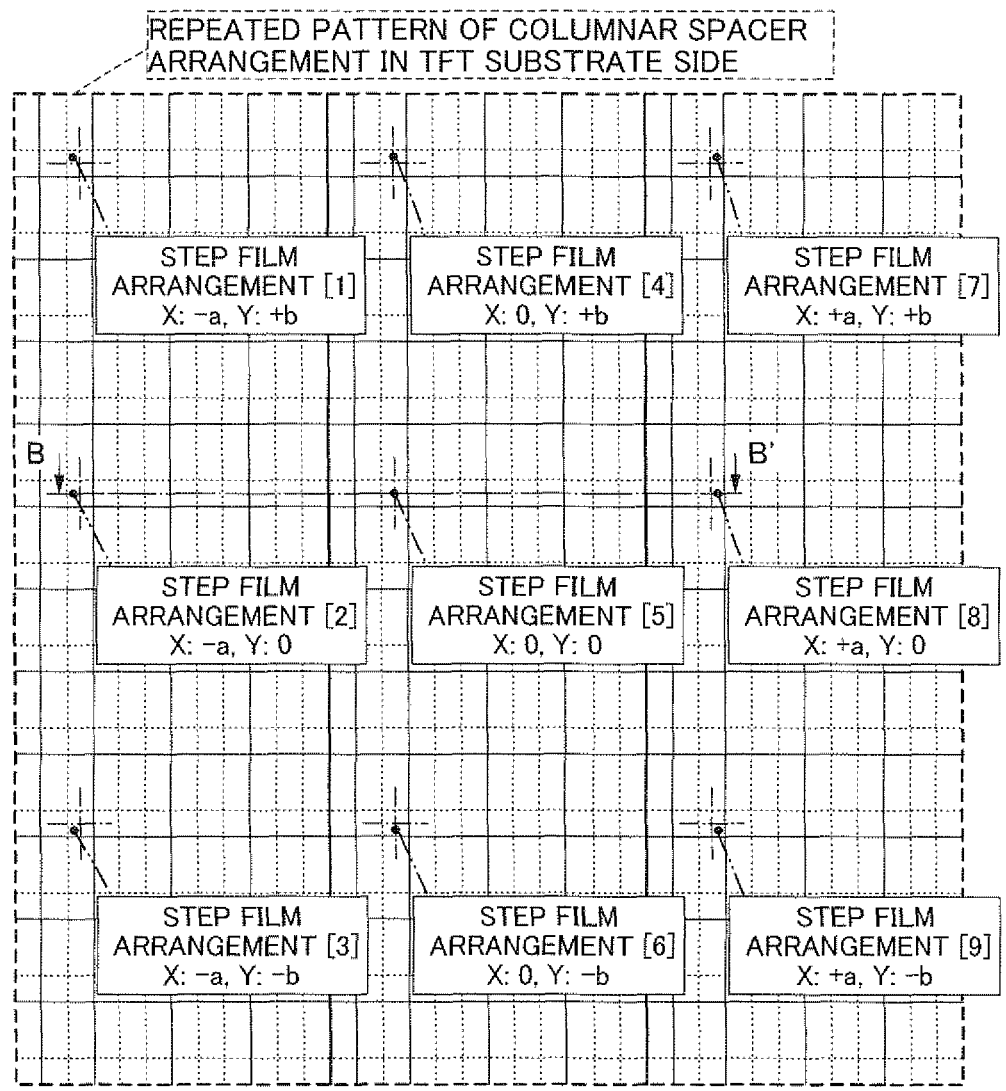

FIG. 4B indicates a repeat arrangement of a step film of a TFT substrate according to this exemplary embodiment.

The step film 109 formed onto the TFT substrate 100 is arranged for every 16 pixels (4 pixels×4 pixels). Each step film 109 is arranged at a position corresponding to the columnar spacer 205a. That is, nine positions of the step film 109 are arranged in the area of 12 pixels×12 pixels.

Here, the central coordinate of the step film 109 and the central coordinate of the corresponding columnar spacer 205a are designed such that they are different coordinates in at least eight positions arranged in a area of 12 pixels×12 pixels. The step film 109 formed onto the TFT substrate 100 is arranged in the whole panel surface repeatedly making this area of 12 pixels×12 pixels one unit. Meanwhile, the central coordinates of the step film 109 and the columnar spacer 205a mean central coordinates when the step film 109 and the columnar spacer 205a are seen in the normal direction of the display surface of the liquid crystal display device. When the step film 109 and the columnar spacer 205a are of polygon shapes, a central coordinate means the coordinate of the center of the circumscribed circle of each of the polygons. Or, when the step film 109 and the columnar spacer 205a are cylindrical, a central coordinate is the coordinate of the center of each circle. In this exemplary embodiment, it is designed that the step film 109 has a quadrangle shape, that is, a polygon shape. It is also designed that the columnar spacer 205a is cylindrical. Therefore, in this exemplary embodiment, the central coordinate of the step film 109 means the coordinate of the center of the circumscribed circle of the step film 109. Also, the central coordinate of the columnar spacer 205a means the coordinate of the center of the circle of the columnar spacer 205a.

Specifically, the central coordinate of the step film 109 that is indicated by step film arrangement [5] which is in the center of a repeated arrangement is designed as follows. That is, the central coordinate of the step film 109 has no shift in both the x-direction and the y-direction from the central coordinate of the columnar spacer 205.

The central coordinate of the step film 109 which is arranged in the diagonally top left side of the step film arrangement [5] and indicated by step film arrangement [1] is designed as follows. That is, the central coordinate of the step film 109 is shifted with distance "a" in the minus direction (that is, to the left) for the x-direction and shifted with distance "b" in the plus direction (that is, to the upper side) for y-direction from the central coordinate of the columnar spacer 205.

The central coordinate of the step film 109 that is indicated by step film arrangement [2] and arranged in the left side of the step film arrangement [5] is designed as follows. That is, the central coordinate of the step film 109 is shifted with distance "a" in the minus direction only for the x-direction from the central coordinate of the columnar spacer 205.

The central coordinate of the step film 109 that is indicated by step film arrangement [3] and arranged in the diagonally bottom left side of the step film arrangement [5] is designed as follows. That is, the central coordinate of the step film 109 is shifted with distance "a" in the minus direction (that is, to the left) for the x-direction and shifted with distance "b" in the minus direction (that is, to the lower side) for y-direction from the central coordinate of the columnar spacer 205.

The central coordinate of the step film 109 that is indicated by step film arrangement [4] and arranged in the upper side of the step film arrangement [5] is designed as follows. That is, the central coordinate of the step film 109 is shifted with distance "b" in the plus direction (to the upper side) only for the y-direction from the central coordinate of the columnar spacer 205.

The central coordinate of the step film 109 that is indicated by step film arrangement [6] and arranged in the under side of the step film arrangement [5] is designed as follows. That is, the central coordinate of the step film 109 is shifted with distance "b" in the minus direction (to the under side) only for the y-direction from the central coordinate of the columnar spacer 205.

The central coordinate of the step film 109 that is indicated by step film arrangement [7] and arranged in the diagonally top right side of the step film arrangement [5] is designed as follows. That is, the central coordinate of the step film 109 is shifted with distance "a" in the plus direction (that is, to the right) for the x-direction and shifted with distance "b" in the plus direction (that is, to the upper side) for y-direction from the central coordinate of the columnar spacer 205.

The central coordinate of the step film 109 that is indicated by step film arrangement [8] and arranged in the right side of the step film arrangement [5] is designed as follows. That is, the central coordinate of the step film 109 is shifted with distance "a" in the plus direction (to the right side) only for the x-direction from the central coordinate of the columnar spacer 205.

The central coordinate of the step film 109 that is indicated by step film arrangement [9] and arranged in the diagonally bottom right side of the step film arrangement [5] is designed as follows. That is, the central coordinate of the step film 109 is shifted with distance "a" in the plus direction (that is, to the right) for the x-direction and shifted with distance "b" in the minus direction (that is, to the under side) for y-direction from the central coordinate of the columnar spacer 205.

Here, a specification of the stacking will be described. Generally, optical characteristics of a liquid crystal display panel are maintained by stacking a TFT substrate and a counter substrate with a high degree of accuracy. In the vicinity of the wiring of the TFT substrate, disorder in orientation of liquid crystal that results in light leak is caused by a disclination and the like. An area where a disclination occurs needs to be shaded by BM on the counter substrate side in advance so that such light leak may not be visually recognized. However, when the shielding width is too wide, a reduction of an aperture ratio is caused. Therefore, a proper shielding width of BM is determined based on the stacking accuracy of the device. That is, a stacking specification indicates the tolerance of misalignment in stacking designed based on the stacking accuracy of a device which does not have an influence on the optical characteristics of the liquid crystal, and, for example, is the range of from −6 μm to +6 μm.

Distance "a" and distance "b" in this exemplary embodiment are determined based on the stacking specification. That is, for each value, it is desirable to be designed as a value within a stacking specification of a product for the x-direction and the y-direction.

As a result, when the contact position of a columnar spacer shifts within the range of a stacking specification, at least one of step films in a repeated arrangement unit can be in contact with the highest portion of a columnar spacer. Both distance "a" and distance "b" are set to 5 μm in this exemplary embodiment.

However, only if distance "a" and distance "b" are numerical values within a stacking specification for x-direction and the y-direction of a product respectively, there is no necessity that they are the same numerical value. In each repeated unit, there is also no need that all the shift amount values in the x-direction and the y-direction are the same respectively.

As it has been described above, in this exemplary embodiment, there are nine step films corresponding to columnar spacers in the range of 12 pixels×12 pixels. In addition, the central coordinate of a step film is designed such that it is shifted by 5 μm in one side for both the x-direction and the y-direction with standard deviation σ of 4.3 μm taking the central coordinate of a columnar spacer as the reference.

Meanwhile, the location accuracy of patterning by photolithography is within 2 μm typically. Also, in an area which is very small like the inside of a 12 pixels unit indicated in this exemplary embodiment, a displacement in which the pitch of a step film exceeds 2 μm does not occur naturally. Therefore, for example, by designing such that a shift value in the small area of 10 mm square is 3 µm or more in one side (6 µm in both sides), it is possible to differentiate it from a manufacturing error.

A positional displacement of the central coordinate of a step film from the central coordinate of a columnar spacer which is the reference position in this exemplary embodiment can be checked as follows. That is, the check can be performed by measuring a pitch of each of step films of a TFT substrate and columnar spacers of a counter substrate successively and calculating the difference.

Moreover, in order to exclude influence such as the distortion that comes from bonding the substrates together, the positional displacement of the center of a step film from the center of a columnar spacer in the state where the substrates are bonded is checked as follows. That is, after making laser markings on both of the TFT substrate and the counter substrate, the panel is broken down and the step film and the columnar spacer are checked by measuring each pitch successively.

Meanwhile, according to this exemplary embodiment, although the central coordinate of a step film is shifted in designing taking the central coordinate of a columnar spacer arranged at even intervals as the reference, it is not limited to this. That is, the central coordinate of a columnar spacer may be shifted in designing taking the central coordinate of a step film arranged at even intervals as the reference. Alternatively, a contact position may be shifted by moving both of a step film and a columnar spacer in designing.

Further, in this exemplary embodiment, although the repeated arrangement in which, for nine step films formed in a range of 12 pixels×12 pixels, the position of a step film to a columnar spacer is changed periodically for both of the x-direction and the y-direction has been described, it is not limited to this. That is, for example, when only the size of the y-direction of a step film is smaller than a columnar spacer, a repeated arrangement may be such that the position of a step film to a columnar spacer is changed only in the y-direction. When only the size of the x-direction of the step film is smaller than a columnar spacer, a repeated arrangement may be such that the position of a step film to a columnar spacer is changed only in the x-direction.

Further, the structure may be such that, for arrangement of at least one of a step film and a columnar spacer, a position is randomly changed one-dimensionally or two-dimensionally in a repeated arrangement unit. Yet further, arrangement of at least one of a step film and a columnar spacer may be an entirely random arrangement, not a repeated arrangement. That is, arrangement only has to be designed such that, even when misalignment of stacking occurs, relative positions of at least one of step films within the range of a repeated unit come to a proper position for a columnar spacer.

In this exemplary embodiment, the pixel size and the pixel interval are uniform. The arrangement interval of a columnar spacer is even. Therefore, the arrangement pitch of a step film changes repeatedly and periodically in both the x-direction and the y-direction in units of 12 pixels. That is, the arrangement pitch of a step film is changed in the range of plus/minus 5 µm (a 10 µm range) from the arrangement pitch of a columnar spacer which is the reference.

When described using the arrangement pitch, it is as follows. That is, according to this exemplary embodiment, although the arrangement is designed such that, about nine step films formed in the range of 12 pixels×12 pixels, the arrangement pitch of a step film is a repeated arrangement changed periodically in both of the x-direction and the y-direction, it is not limited to this. That is, for example, when only the size of the y-direction of a step film is smaller than a columnar spacer, the arrangement may be a repeated arrangement in which the arrangement pitch of a step film is changed in only the y-direction. When only the size of the x-direction of a step film is smaller than a columnar spacer, the arrangement may be a repeated arrangement in which the arrangement pitch of the step film is changed in only the x-direction.

Further, the structure may be such that the arrangement pitch of at least one of a step film and a columnar spacer is randomly changed one-dimensionally or two-dimensionally in a repeated arrangement unit. That is, arrangement only has to be designed such that, even when misalignment of stacking occurs, relative positions of at least one of step films within a repeated unit come to a proper position for a columnar spacer.

It is desirable that the range of a repeated unit is about 10 mm square or less, and it is more desirable it is 6 mm square or less. The reason will be described.

A pressing load needed to deform a columnar spacer used in a liquid crystal display device of this exemplary embodiment by 0.4 µm is about 20 mN per one columnar spacer. For example, it is assumed that cells are formed employing a glass substrate of the board thickness of 0.5 mm as the substrate of a liquid crystal display panel so that a columnar spacer may be deformed by 0.4 µm. In this case, when the interval of columnar spacers which always make contact is 6 mm, the maximum bending of the glass will be about 0.06 µm.

If the range of a repeated unit of a columnar spacer becomes large, and the distance between neighboring always-contacting columnar spacers becomes long, the bending of the glass becomes large. As a result, nonuniformity occurs to a cell gap. For example, when the interval of a columnar spacer which is always contacting is 7 mm, the maximum bending of the glass will be about 0.08 µm. When the interval of a columnar spacer is 8 mm, the maximum bending of the glass will be about 0.1 µm. When the interval of a columnar spacer is 9 mm, the maximum bending of the glass will be about 0.14 µm. When the interval of a columnar spacer is 10 mm, the maximum bending of the glass will be about 0.17 µm.

In a TN (Twisted Nematic) product, when there is a change of about 0.2 µm in a cell gap, it is visually recognized as nonuniformity of luminance. Similarly, in an IPS (In Plane Switching) product, when there is a change of about 0.15 µm in a cell gap, it is visually recognized as an unevenness of luminance. Accordingly, by making the range of a repeated unit about 10 mm square or less, a volume of glass bending can be suppressed within the range where the problem of unevenness of luminance does not occur. Moreover, by making the range of a repeated unit 6 mm square or less, nonuniformity in a cell gap can be reduced to no more than 50% of the nonuniformity in the cell gap where the unevenness problem of luminance occurs.

Here, a cell gap between spacers is maintained by a stiffness of glass. Therefore, when the thickness of the glass becomes thin, it is necessary to make the range of a repeated unit small. For example, when the glass thickness is 0.3 mm, it is desirable to make the range of a repeated unit 4 mm square or less.

A cell gap is usually supported only by the columnar spacer 205a which is in contact with the step film 109. In view of cubical expansion of liquid crystal by a temperature rise, it is desirable to perform forming of a cell as follows. That is, it is desirable to perform forming of a cell so that the columnar spacer 205a may be in the state that it is pressed and deformed by 0.1 µm-0.4 µm by elastic deformation. As a result, even if cubical expansion of a liquid crystal material by a temperature rise occurs, it will be in the state that the tip of the columnar spacer 205a is still pressed against a TFT substrate.

Therefore, an unevenness of luminance which is caused by a liquid crystal material which is moved toward the lower part of the panel by a gravity enlarging the cell gap can be suppressed.

According to this exemplary embodiment, the height of the columnar spacer 205 is measured first. Then, according to the measurement result, the amount of liquid crystal to be dropped is adjusted. As a result, the amount of deformation of the columnar spacer 205a is controlled such that it is about 0.2 µm stably.

Next, a contact state of the columnar spacer 205 and the step film 109 will be described using FIGS. 5A-C and FIGS. 6A-C.

FIGS. 5A-C are schematic illustrations showing a contact state of the columnar spacer 205 and the step film 109 in a case where the columnar spacer 205 is of convex shape and the central part of its tip is the highest portion.

First, the case where there is no fitting misalignment between the TFT substrate 100 and the counter substrate 200 as shown in FIG. 5A will be described. In this case, at the portion corresponding to step film arrangement [5], the central part of the step film 109 and the tip central part of the columnar spacer 205 which is the highest part make contact with each other. At portions corresponding to step film arrangement [4] and step film arrangement [6], the central part of the step film 109 and a part shifting from the central part of the columnar spacer 205 by distance "a" are contacted.

As mentioned above, the columnar spacer 205a is formed such that it is in a state where it is deformed by 0.1-0.4 µm. Therefore, a columnar spacer may be in contact with a step film at positions of step film arrangement [4] and step film arrangement [6]. However, the cell gap is determined mainly in a portion of step film arrangement [5] where a step film is in contact with a columnar spacer at its highest portion.

Next, as shown in FIGS. 5B and C, cases where a misalignment occurs between the TFT substrate 100 and the counter substrate 200 will be described. In this case, at portions of step film arrangement [4] or step film arrangement [6], the central part of the step film 109 and the highest part in the tip central part of the columnar spacer 205 are in contact with each other. And, the cell gap is determined mainly at this contact part.

FIGS. 6A-C is schematic illustrations showing a contact state of the columnar spacer 205 and the step film 109 when the columnar spacer 205 has a concave shape with the tip central part thereof being dented.

First, the case where there is no fitting misalignment between the TFT substrate 100 and the counter substrate 200 as shown in FIG. 6A will be described. In this case, at the portion corresponding to step film arrangement [5], the central part of the step film 109 and the central part of the columnar spacer 205 which is dented make contact with each other. The step film 109 and the highest part of the columnar spacer 205 are in contact with each other at portions corresponding to step film arrangement [4] and step film arrangement [6]. And the cell gap is determined at this contact portion.

Next, as shown in FIGS. 6B and C, cases where a misalignment occurs between the TFT substrate 100 and the counter substrate 200 will be described. In this case, the central part of the step film 109 and the highest part of the columnar spacer 205 are in contact with each other at the portion of step film arrangement [5]. And, the cell gap is determined mainly at this contact part.

Thus, the highest position of the tip part of a columnar spacer and a step film make contact with each other at least one portion in a repeated arrangement area regardless of the shape of a columnar spacer and of whether there is a fitting misalignment or not. Because this contact part determines a cell gap, the cell gap is always kept constant in each repeated unit.

The Thickness of a Step Film

The thickness of the step film 109 needs to be designed so that the columnar spacer 205b arranged in a portion where there is not the step film 109 may touch the TFT substrate 100 only in a case when a local load is added temporarily. That is, the thickness of the step film 109 needs to be designed so that there are no cases that the columnar spacer 205b touches the TFT substrate 100 in normal times. Further, it is preferable that the thickness of the step film 109 is 100 nm-600 nm. According to this exemplary embodiment, the thickness of the step film 109 is 300 nm. The step film 109 is formed in the same layer using the same material with drain wiring. The reason will be described.

As mentioned above, a columnar spacer is used in a state that it is deformed by 0.1-0.4 µm. Therefore, it is desirable that the minimum thickness of a step film is at least no smaller than 0.1 µm.

Next, a case when a local load is added to the surface of a liquid crystal display panel and the tip of the columnar spacer 205a is deformed to a level that the tip of the columnar spacer 205b touches the TFT substrate will be described. In this case, the columnar spacer 205a will be in a state deformed further by the thickness of the step film.

For example, assuming that the thickness of the step film is set to 0.8 µm and the columnar spacer 205a is deformed to the level that the columnar spacer 205b touches the TFT substrate. In this case, the plastic deformation volume of the columnar spacer 205a will be about 0.2 µm. Nonuniformity of the cell gap occurs in the portion to which the load has been added.

Similarly, assuming that the thickness of the step film is set to 0.6 µm and the columnar spacer 205a is deformed to the level that the columnar spacer 205b touches the TFT substrate. In this case, the plastic deformation volume of the columnar spacer 205a will be about 0.14 µm.

Assuming that the thickness of the step film is set to 0.4 µm and the columnar spacer 205a is deformed to the level that the columnar spacer 205b touches the TFT substrate. In this case, the plastic deformation volume of the columnar spacer 205a will be about 0.09 µm.

Assuming that the thickness of the step film is set to 0.35 µm and the columnar spacer 205a is deformed to the level that the columnar spacer 205b touches the TFT substrate. In this case, the plastic deformation volume of the columnar spacer 205a will be about 0.07 µm.

That is, by setting the thickness of the step film to 0.6 µm or less, a plastic deformation volume of the columnar spacer 205a can be in the range that the problem of unevenness of luminance does not occur. Moreover, by setting the thickness of the step film to 0.35 µm or less, a variation of a cell gap can be set to 50% or less of the variation of the cell gap in which the problem of unevenness of luminance occurs.

The Size of a Columnar Spacer and a Step Film

It is desirable that the size of the columnar spacer 205a is designed in consideration of shifting distance "a" and "b" of the central coordinates of the step film 109 and the columnar spacer 205. That is, it is desirable to design arrangement so that more than half of more than one step film 109 may touch the columnar spacer 205a even if a fitting misalignment occurs. In this exemplary embodiment, the size of the columnar spacer 205a is made 28 μm in diameter.

Also, it is desirable to design the size of the columnar spacer 205b so that unevenness of a cell gap by plastic deformation of a columnar spacer which occurs when the local load is added may be suppressed. Here, the inventors of the present invention have confirmed experimentally that a withstand load of about 5 kg/10 mm diameter is obtained when the area of the tip part of the columnar spacer 205b (the columnar spacer upper base area) is set to 0.1% or more of the area of the whole panel. Accordingly, in this exemplary embodiment, the size of the columnar spacer 205b is set to 20 μm in diameter which is about 0.2% of the area of the whole panel.

The tip part of the columnar spacer 205 is not perfectly flat. Therefore, the area of the cross-sectional surface in a position corresponding to 94% of the maximum height of a columnar space is made the upper base area of the columnar spacer. As for the height of a columnar spacer, the opening surface of the blue color is used as the reference.

Next, the reason why the size of the columnar spacer 205b is designed such that it is smaller than the columnar spacer 205a in this exemplary embodiment will be described.

When rubbing processing is applied to the surface of a counter substrate with a columnar spacer, orientation is disordered slightly in a portion which is shaded by the columnar spacer in comparison with the other portions. As a result, a streak-like light leak may be caused. Therefore, it is desirable to make the columnar spacer 205 small within the range where a plastic deformation of the columnar spacer material by a local load added does not occur. Therefore, according to this exemplary embodiment, the size of the columnar spacer 205b is made 20 μm in diameter. When the size of the columnar spacer 205b is made the same size as the columnar spacer 205a on the one hand, the number of the arranged columnar spacer 205b may be reduced. Even in this case, a light leak at a portion which is shaded by a columnar spacer can be reduced.

When a contact area of the columnar spacer 205a and the step film 109 becomes large, the frictional force between the substrates becomes large. As a result, a residual stress occurs to the glass. Therefore, a light leak in a black screen is caused by the retardation of the glass.

From the above, it is desirable that the size of the step film 109 that is formed in a position overlapping with the columnar spacer 205a is as small as possible considering suppression of a light leak in a black screen. Further, it has been confirmed experimentally that generally good indication is obtained by setting the contact area of the columnar spacer 205a and the step film 109 to 200 ppm or less of the area of the whole panel. Accordingly, in this exemplary embodiment, the step film 109 is designed such that it has the shape of 10 μm square, which is about 90 ppm of the area of the whole panel.

As mentioned above, in this exemplary embodiment, the size of the columnar spacer 205a is made 28 μm in diameter. Also, the step film 109 is made 10 μm square. Further, a position shift between the central coordinate of the columnar spacer 205a and the central coordinate of the step film 109 is set such that the maximum value is +5 μm and the minimum −5 μm.

Yet further, the step film 109 is designed such that it is settled in the range of the columnar spacer 205a by satisfying the following relational expression.

$$D1-D2 \leq W2-W1$$

where W1 is the width of the step film 109. W2 is the width of the columnar spacer 205a in the same direction with W1. D1 is the maximum value of a positional shift of the central coordinate of the step film 109 and the central coordinate of the columnar spacer 205a. D2 is the minimum value of a positional shift of the central coordinate of the step film 109 and the central coordinate of the columnar spacer 205a.

Thus, in this exemplary embodiment, when seen in the normal direction of the display surface of a liquid crystal display device, the size of the step film 109 is smaller than the columnar spacer 205 formed onto the counter substrate 200 in at least one direction.

As a result, the gate line 102 and the COM wiring 103 in the neighborhood can be made densely arranged in designing. Therefore, it can be high-aperture-ratio design.

When the tip of the columnar spacer 205 is not flat and if the step film 109 is made smaller than the columnar spacer 205, the following problem occurs. That is, in this case, when a stacking misalignment occurs, a contact position of the step film 109 and the tip part of the columnar spacer 205 varies in the panel surface. As a result, a problem that nonuniformity of a cell gap is caused occurs. Therefore, usually, it is necessary to design the columnar spacer 205 large taking account of a region where the shape of the tip of the columnar spacer 205 becomes unstable. Therefore, an aperture ratio becomes small.

On the other hand, in this exemplary embodiment, the tip part of the columnar spacer 205 with which the step film 109 is in contact does not have to be flat necessarily. Therefore, nonuniformity of a cell gap can also be suppressed even in a high aperture rate design.

Further, the height of the columnar spacer 205 may be optimized considering the cell gap of a product, the thickness of a step film which is arranged on a TFT substrate with which the columnar spacer 205a are in contact and a shrinking amount of the columnar spacer 205 by a thermal step. In this exemplary embodiment, in order to obtain a cell gap of about 4 μm, the height from a pixel part to the vertex part of a columnar spacer is set to about 3.5 μm. Further, in our experiments, the columnar spacer material used in this exemplary embodiment was shrunk by about 3% of its height in calcination step of an alignment film.

In addition, although the step film 109 is formed so that it is in the same layer as the drain line 107 in this exemplary embodiment, it is not limited to this. That is, the step film 109 may be formed so that it is in the same layer as the a-Si layer 106. Further, the step film 109, the a-Si layer 106 and the metal layer in which the drain line 107 is formed may be designed as a lamination structure. Additionally, the step film 109 may be formed in the same layer as the gate line 102 in which it is arranged in portions besides the gate line 102. Further, by forming a step by a presence or absence of the passivation film 110 formed by contact etching, the step may be regarded as the step film 109.

Although, in this exemplary embodiment, the columnar spacer 205 has a structure including the columnar spacer 205a that is arranged in a position corresponding to the step film 109 formed onto the TFT substrate 100 and the columnar spacer 205b arranged in a position without the step film 109, it is not limited to this. That is, every columnar spacer 205 may be arranged in a position corresponding to the step film 109.

Next, the manufacturing method of a liquid crystal display device in this exemplary embodiment will be described.

In the process of the TFT substrate 100, a first conduction material is coated by a sputtering method on the glass substrate 101 first. After that, the gate line 102, a gate electrode, the COM wiring 103 and the COM electrode 104 are formed in the same layer by photolithography. The first conductive film is made a lamination structure of a Cr film and an Al alloy. The film thickness of the first conductive film is made 500 nm in total.

Next, the gate insulation film 105 and the a-Si layer 106 made of silicon oxynitride are formed by a CVD (Chemical Vapor Deposition) method. After that, the a-Si layer 106 is patterned by photolithography to form an island.

Next, a second conduction material film is formed by a sputtering method. After that, the drain line 107, a source electrode, a drain electrode, the pixel electrode 108 and the step film 109 for supporting a columnar spacer are formed in the same layer by photolithography. A Cr film is used as the second conductive film. The film thickness of the second conductive film is made 300 nm.

Next, the passivation film 110 made of silicon oxynitride is formed by CVD method. Then, a contact hole of a terminal portion is formed by photolithography.

Next, ITO (Indium Tin Oxide) film is formed by a sputtering method. After that, the surface of the terminal portion is covered with an ITO film by photolithography.

In the counter substrate 200 side, coating film forming of a black resin material is performed on the glass substrate 201. Then, the BM 202 is formed by photolithography.

Next, the color layer 203 is formed by coating film forming of a photosensitivity pigment resist of each of red, green and blue and by photolithography.

Then, OC layer 204 is formed by coating film forming of a thermal cure overcoat (OC) material made from an acrylic material and by calcination.

After that, by coating film forming of a photosensitivity columnar spacer material made from an acrylic material and by photolithography, the columnar spacer 205 is formed.

Next, by printing and baking of an alignment film, the alignment film is formed onto each of the TFT substrate 100 and the counter substrate 200. After that, rubbing processing is performed. Here, an alignment film is baked for 60 minutes at 230° C.

Next, a seal pattern is formed using a sealing agent of the hybrid type (photo hardening and thermal hardening) in the peripheral part of the TFT substrate.

Next, the liquid crystal 206 is dropped on the surface of either the TFT substrate or the counter substrate. After that, the TFT substrate and the counter substrate are stacked together at a predetermined position in a vacuum environment, making them situated in a close distance. After that, they are released in the atmosphere, and the two substrates are stuck together. Meanwhile, in this exemplary embodiment, measurement of the height of a columnar spacer is performed beforehand. The amount of liquid crystal that is dropped is adjusted according to the result of the height measurement. As a result, the amount of deformation of a columnar spacer is controlled such that it will be about 0.2 μm.

Next, UV ray is irradiated to the seal pattern. After that, the sealing material is hardened by heating. As a result, a stacked substrate is produced. Here, the UV irradiation amount to the seal pattern is set to 3000 mJ. The cure temperature is set to 60 minutes at 120° C.

Next, the stacked substrate is cut in units of a panel, and a polarizing plate is stuck on both sides of a panel. As a result, a liquid crystal display panel is completed.

This exemplary embodiment is an effective means to prevent nonuniformity of a cell gap in a liquid crystal display panel using a columnar spacer irrespective of the drive system of a liquid crystal display panel. The drive system includes such as TN method, VA (Vertical Alignment) method, IPS method and FFS (Fringe Field Switching) method, for example.

The Third Exemplary Embodiment

Figure 7A:
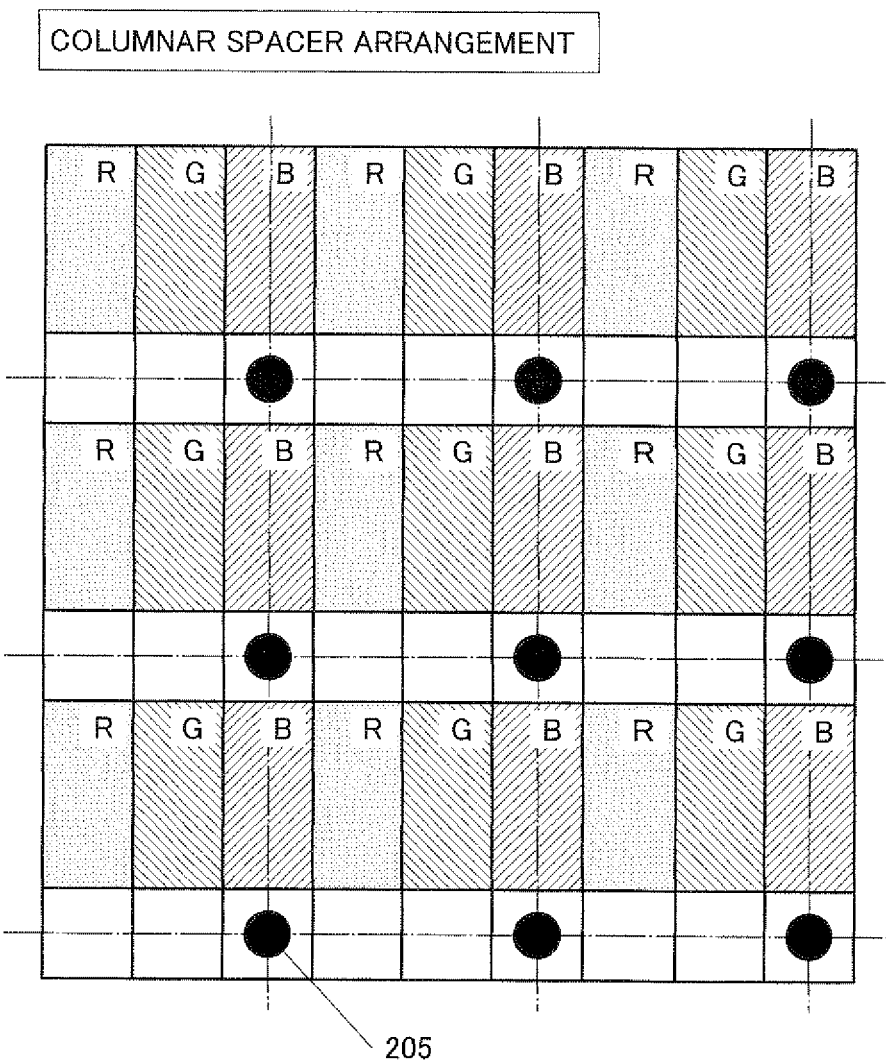
FIG. 7A is a schematic diagram showing the repeat pattern of columnar spacers of a third exemplary embodiment of the present invention.

Next, a liquid crystal display device according to the third exemplary embodiment of the present invention will be described. FIGS. 7A, B are schematic illustrations showing the repeat patterns of a columnar spacer and a step film of this exemplary embodiment.

The arrangement positional relationship between a convex step film 109 and a columnar spacer 205 in this exemplary embodiment will be described using FIGS. 7A, B.

FIG. 7A indicates the columnar spacer arrangement of a counter substrate of this exemplary embodiment. The columnar spacer 205 arranged in the counter substrate 200 side is arranged on the BM 202 corresponding to every point of the blue color layer.

Figure 7B:
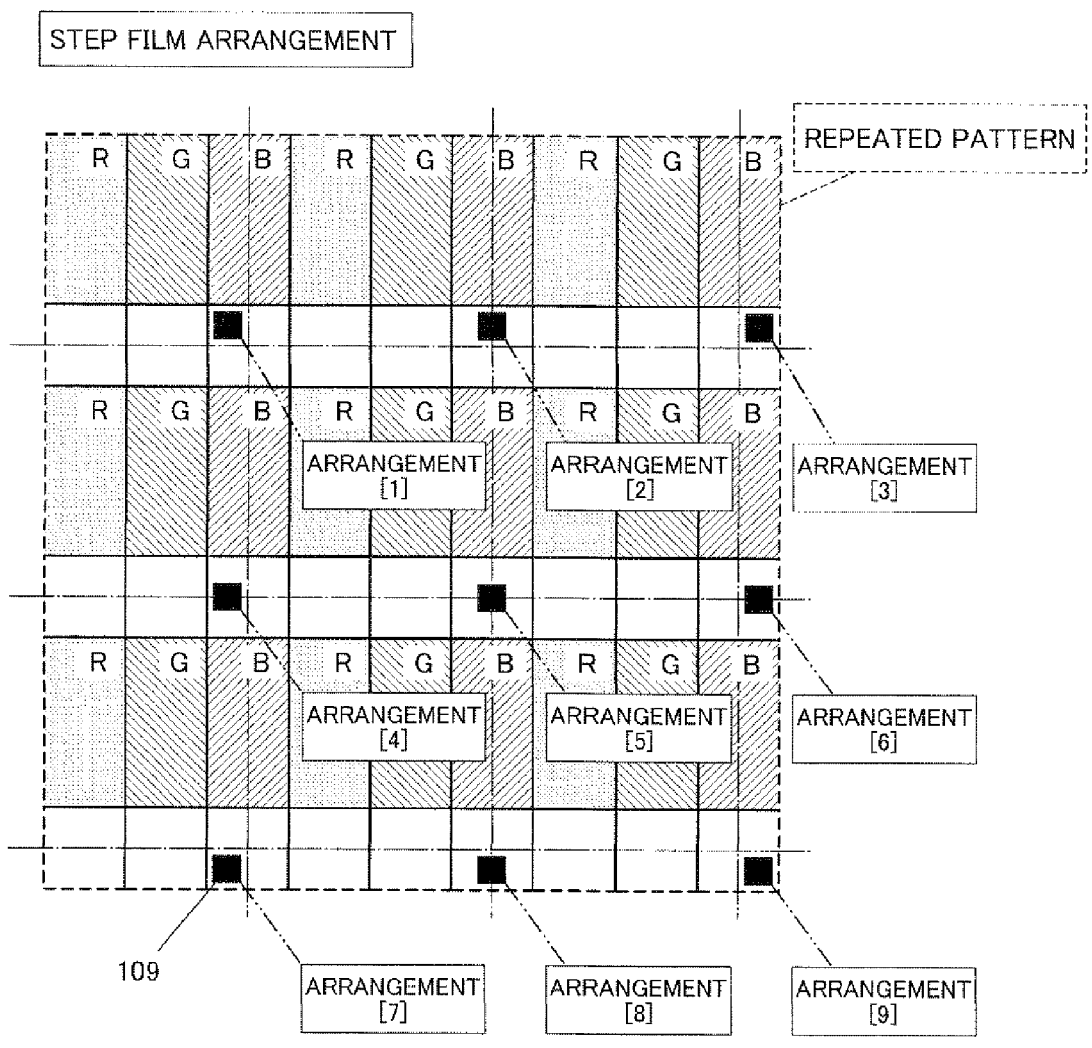
FIG. 7B is a schematic diagram showing the repeat pattern of step films of the third exemplary embodiment of the present invention.

FIG. 7B indicates the repeat pattern of a step film of a TFT substrate of this exemplary embodiment. The step film 109 formed onto the TFT substrate 100 is arranged in all positions facing the columnar spacer 205.

Here, the central coordinate of the columnar spacer 205a corresponding to the central coordinate of the step film 109 is designed such that they are different coordinates in at least eight positions arranged in a area of 3 pixels×3 pixels. The step film 109 formed onto the TFT substrate 100 is arranged in the whole panel surface repeatedly making this area of 3 pixels×3 pixels one unit.

The shift state of the XY coordinate of each of arrangement [1]-[9] of the corresponding step film 109 when the central coordinate of the columnar spacer 205 is taken as the reference is indicated in the table of FIG. 7B. Here, it is made "a"=5 μm and "b"=5 μm.

There are nine points where a columnar spacer and a step film are facing each other in a range of 3 pixels×3 pixels. In addition, like the second exemplary embodiment, the central coordinate of a step film is designed such that it is shifted by 5 μm in one side for both the x-direction and the y-direction with standard deviation σ of 4.3 μm taking the central coordinate of a columnar spacer as the reference. The arrangement pitch of a step film changes repeatedly and periodically in both the x-direction and the y-direction in units of 3 pixels. Here, the arrangement pitch of a step film is designed such that it changes in the range of plus/minus 5 μm (a 10 μm range) from the arrangement pitch of a columnar spacer which is the reference.

As shown in this exemplary embodiment, the columnar spacer 205 and the step film 109 may be configured such that they are arranged in all pixels. Even in a case of such structure, the same effect as the second exemplary embodiment can be obtained. A liquid crystal display device of this exemplary embodiment can be produced using the same process as the second exemplary embodiment.

The Fourth Exemplary Embodiment

Figure 8A:
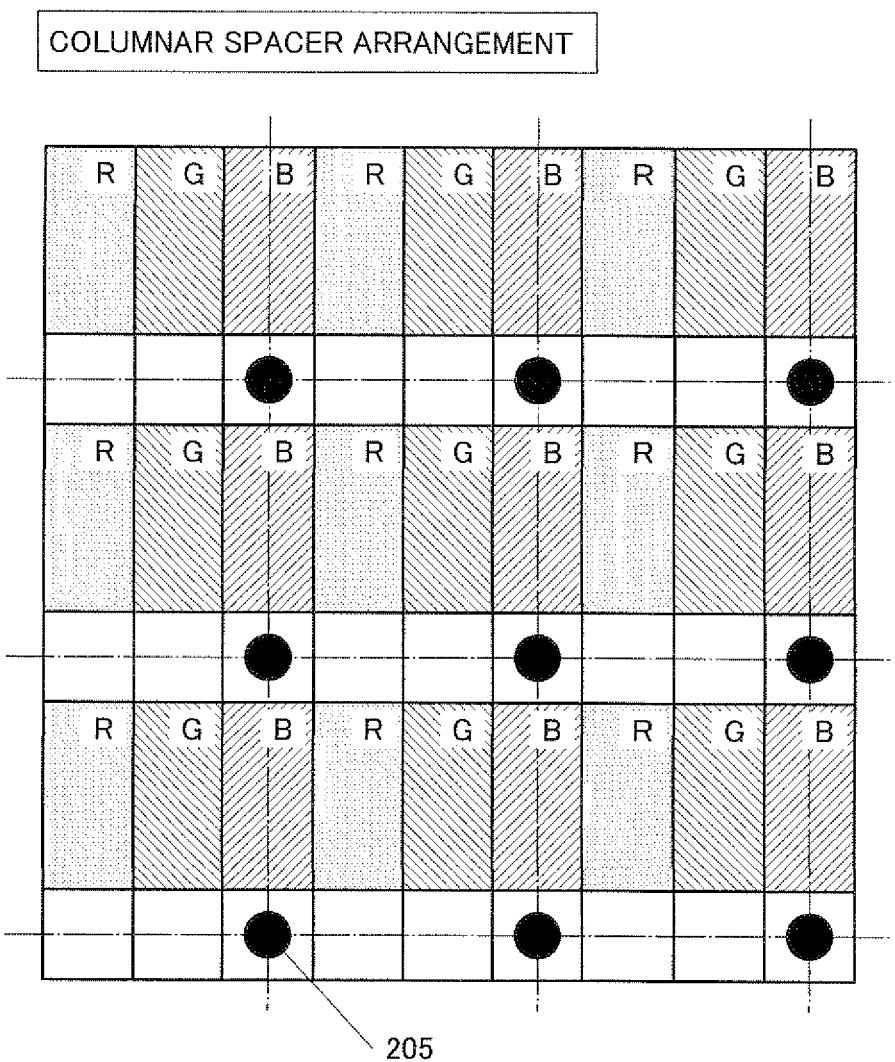
FIG. 8A is a schematic diagram showing the repeat pattern of columnar spacers of a fourth exemplary embodiment of the present invention.

Next, a liquid crystal display device according to the fourth exemplary embodiment of the present invention will be described. FIGS. 8A, B are schematic illustrations showing the repeat patterns of a columnar spacer and a step film of this exemplary embodiment.

The arrangement positional relationship between the convex step film 109 and the columnar spacer 205 in this exemplary embodiment will be described using FIGS. 8A, B.

FIG. 8A indicates the columnar spacer arrangement of a counter substrate of this exemplary embodiment. This is similar to the columnar spacer arrangement on the counter substrate of the third exemplary embodiment.

Figure 8B:
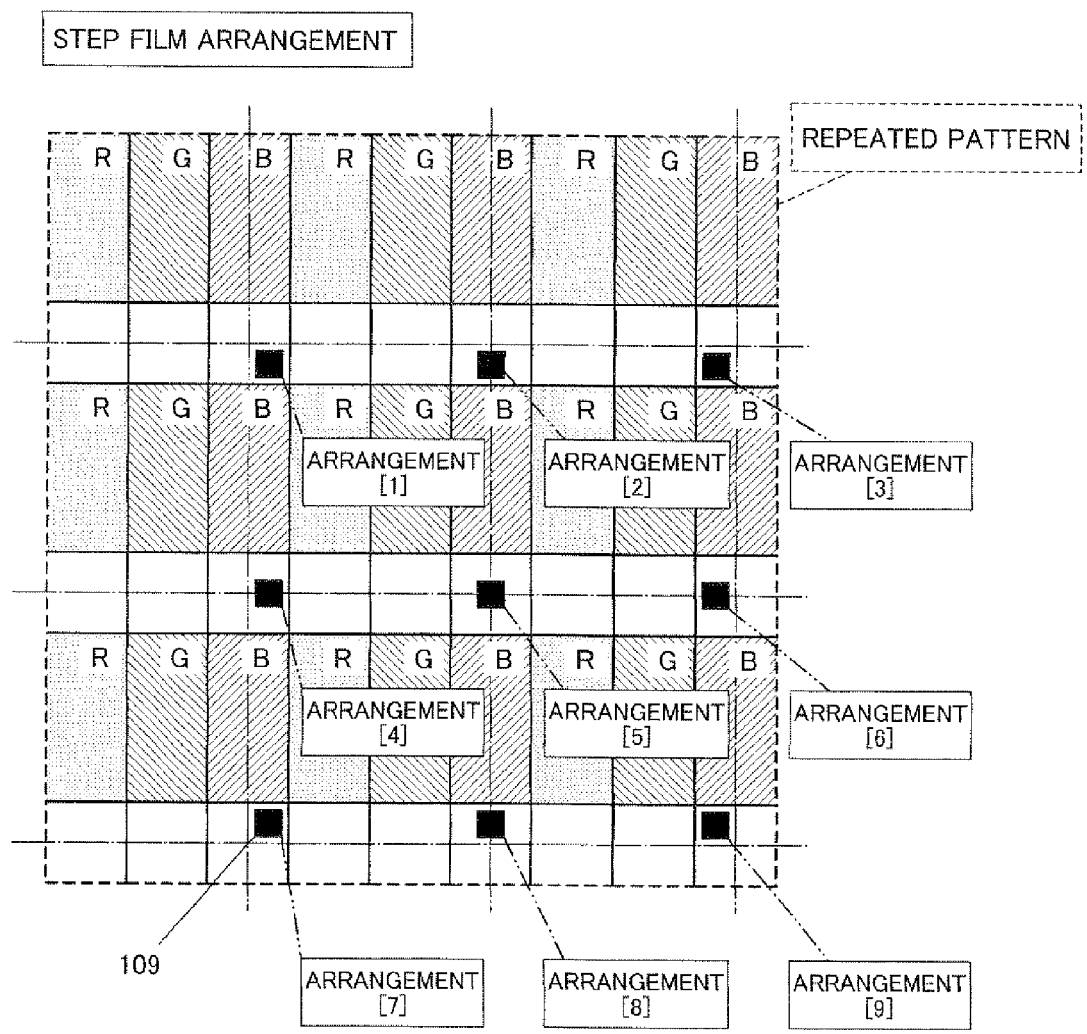
FIG. 8B is a schematic diagram showing the repeat pattern of step films of the fourth exemplary embodiment of the present invention.

FIG. 8B indicates the repeat pattern of a step film of a TFT substrate of this exemplary embodiment. In this exemplary embodiment, the step film 109 formed onto the TFT substrate 100 is arranged in all positions facing the columnar spacer 205 like the third exemplary embodiment.

Here, the central coordinate of the step film 109 and the central coordinate of the columnar spacer 205a corresponding to the step film 109 is designed such that they are different coordinates in at least eight positions arranged in an area of 3 pixels×3 pixels like the third exemplary embodiment. The step film 109 formed onto the TFT substrate 100 is arranged in the whole panel surface repeatedly making this area of 3 pixels×3 pixels one unit.

The shift state of the XY coordinate of each of arrangement [1]-[9] of the corresponding step film 109 when the central coordinate of the columnar spacer 205 is taken as the reference is indicated in the table of FIG. 8B. Here, it is made "a"=5 μm and "b"=5 μm.

In this exemplary embodiment, there are nine points where a columnar spacer and a step film are facing each other in a range of 3 pixels×3 pixels like the third exemplary embodiment. In addition, the central coordinate of a step film is designed such that it is shifted by 5 μm in one side for both the x-direction and the y-direction with standard deviation σ of 4.3 μm taking the central coordinate of a columnar spacer as the reference. The arrangement pitch of a step film changes repeatedly and periodically in both the x-direction and the y-direction in units of 3 pixels. Here, the arrangement pitch of a step film is designed such that it changes in the range of plus/minus 5 μm (a 10 μm range) from the arrangement pitch of a columnar spacer which is the reference.

This exemplary embodiment is different from the third exemplary embodiment in the point that it is designed so that the grid pitch of total of nine step films may be smaller than the grid pitch of the corresponding columnar spacers in the range of a repeated unit of 3 pixels×3 pixels. Even in such case, the same effect as the second exemplary embodiment can be obtained. A liquid crystal display device of this exemplary embodiment can be produced using the same process as the second exemplary embodiment.

The Fifth Exemplary Embodiment

Next, a liquid crystal display device according to the fifth exemplary embodiment of the present invention will be described. FIGS. 9A, B are schematic illustrations showing the repeat patterns of a columnar spacer and a step film of this exemplary embodiment.

The arrangement positional relationship between a convex step film 109 and a columnar spacer 205 in this exemplary embodiment will be described using FIGS. 9A, B.

FIG. 9A indicates the columnar spacer arrangement of a counter substrate of this exemplary embodiment. This is similar to the columnar spacer arrangement on the counter substrate of the third exemplary embodiment.

Figure 9B:
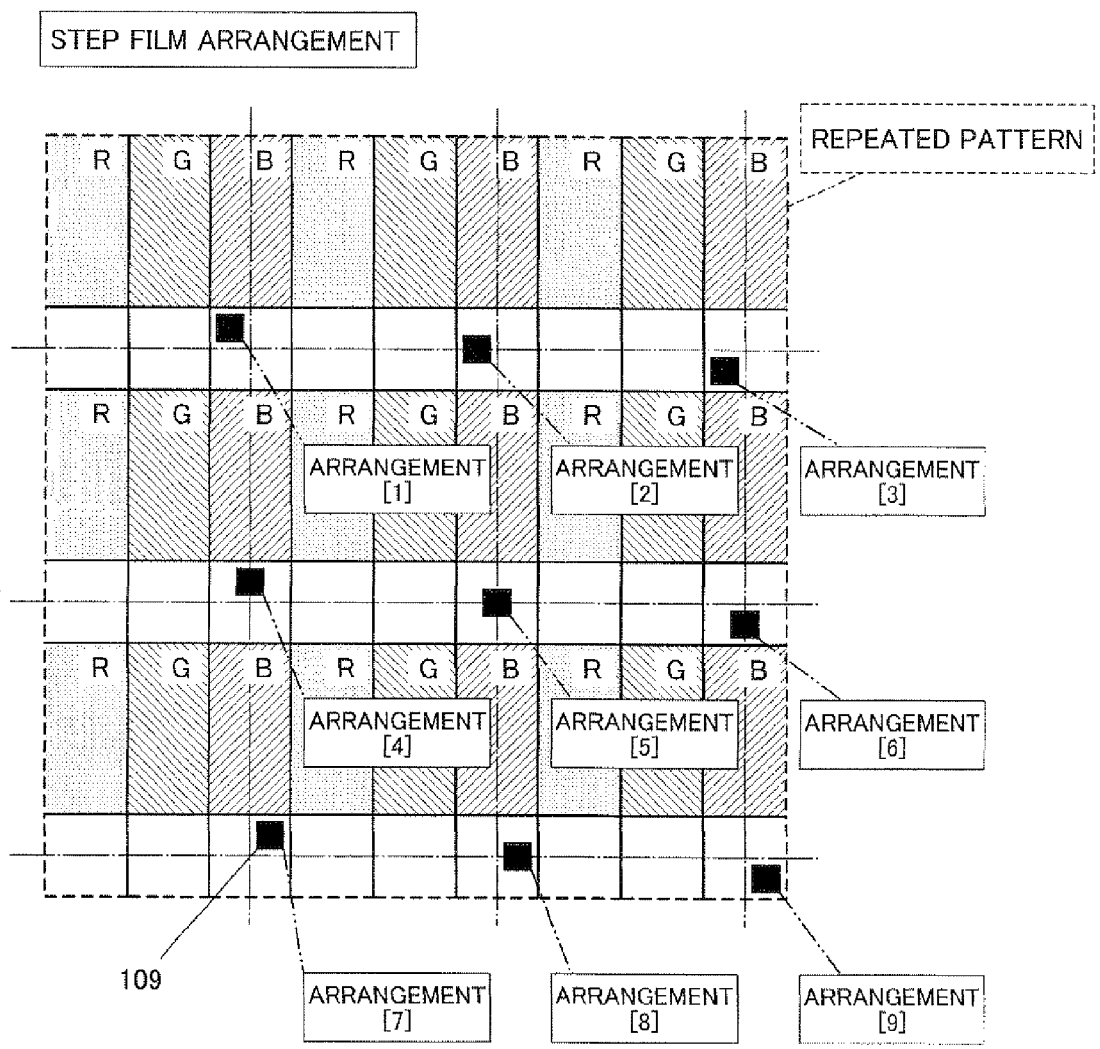
FIG. 9B is a schematic diagram showing the repeat pattern of step films of the fifth exemplary embodiment of the present invention.

FIG. 9B indicates the repeat pattern of the step film of a TFT substrate of this exemplary embodiment. In this exemplary embodiment, the step film 109 formed onto the TFT substrate 100 is arranged in all positions facing the columnar spacer 205 like the third exemplary embodiment.

In this exemplary embodiment, the central coordinate of the step film 109 and the central coordinate of the columnar spacer 205a corresponding to the step film 109 is designed such that they are different coordinates in at least eight positions arranged in a area of 3 pixels×3 pixels like the third exemplary embodiment. The step film 109 formed onto the TFT substrate 100 is arranged in the whole panel surface repeatedly making this area of 3 pixels×3 pixels one unit.

The shift state of the XY coordinate of each of arrangement [1]-[9] of the corresponding step film 109 when the central coordinate of the columnar spacer 205 is taken as the reference is indicated in the table of FIG. 9B. Here, it is made "a"=5 μm and "b"=5 μm.

In this exemplary embodiment, there are nine points where a columnar spacer and a step film are facing each other in a range of 3 pixels×3 pixels like the third exemplary embodiment. In addition, the central coordinate of a step film is designed such that it is shifted by 5 μm in one side for both the x-direction and the y-direction with standard deviation σ of 4.3 μm taking the central coordinate of a columnar spacer as the reference. The arrangement pitch of a step film changes repeatedly and periodically in both the x-direction and the y-direction in units of 3 pixels. Here, the arrangement pitch of a step film is designed such that it changes in the range of plus/minus 5 μm (a 10 μm range) from the arrangement pitch of a columnar spacer which is the reference.

This exemplary embodiment is different from the third exemplary embodiment in the point that it is designed so that the grid pitch of total of nine step films may be deformed into a rhombus shape from the grid pitch of the corresponding columnar spacers in the range of a repeated unit of 3 pixels×3 pixels. Thus, step films are designed such that they are not arranged on a straight line. Even in case of such structure, the same effect as the second exemplary embodiment can be obtained. A liquid crystal display device of this exemplary embodiment can be produced using the same process as the second exemplary embodiment.

The Sixth Exemplary Embodiment

Figure 10A:
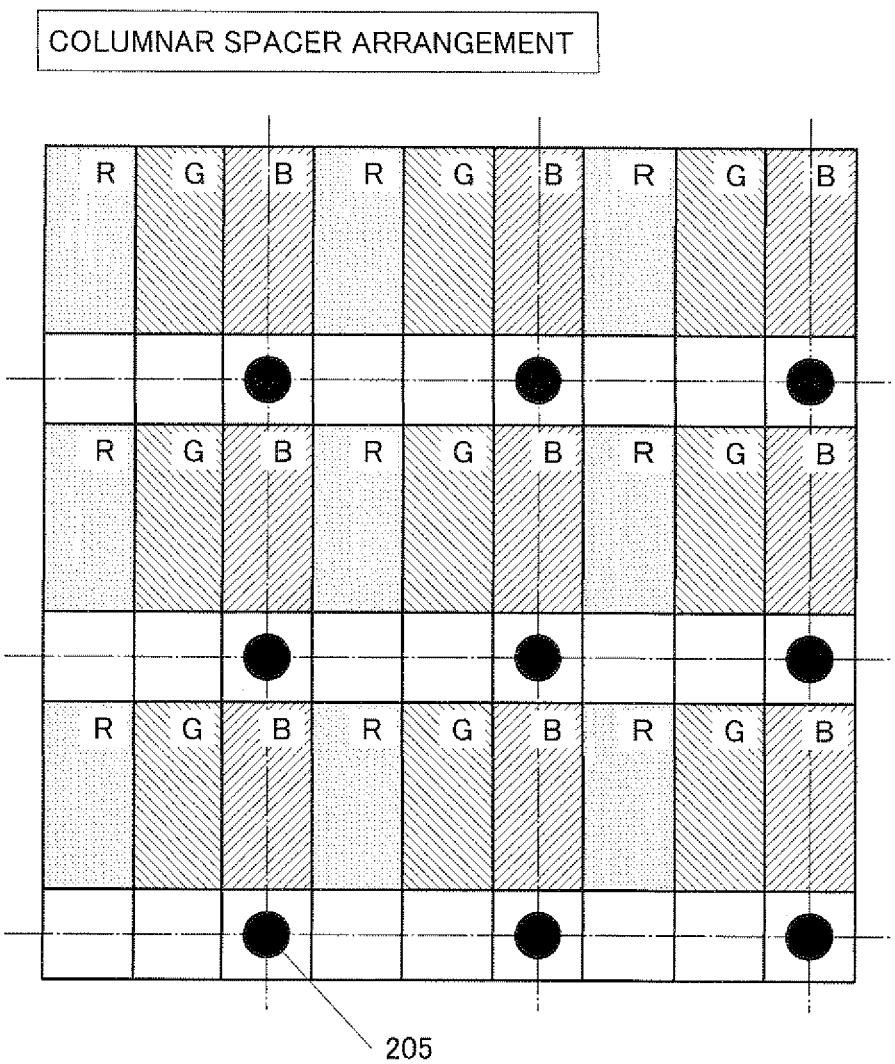
FIG. 10A is a schematic diagram showing the repeat pattern of columnar spacers of a sixth exemplary embodiment of the present invention.

Next, a liquid crystal display device according to the sixth exemplary embodiment of the present invention will be described. FIGS. 10A, B are schematic illustrations showing the repeat patterns of a columnar spacer and a step film of this exemplary embodiment.

The arrangement positional relationship between a convex step film 109 and a columnar spacer 205 in this exemplary embodiment will be described using FIGS. 10A, B.

FIG. 10A indicates the columnar spacer arrangement of a counter substrate of this exemplary embodiment. This is similar to the columnar spacer arrangement on the counter substrate of the third exemplary embodiment.

Figure 10B:
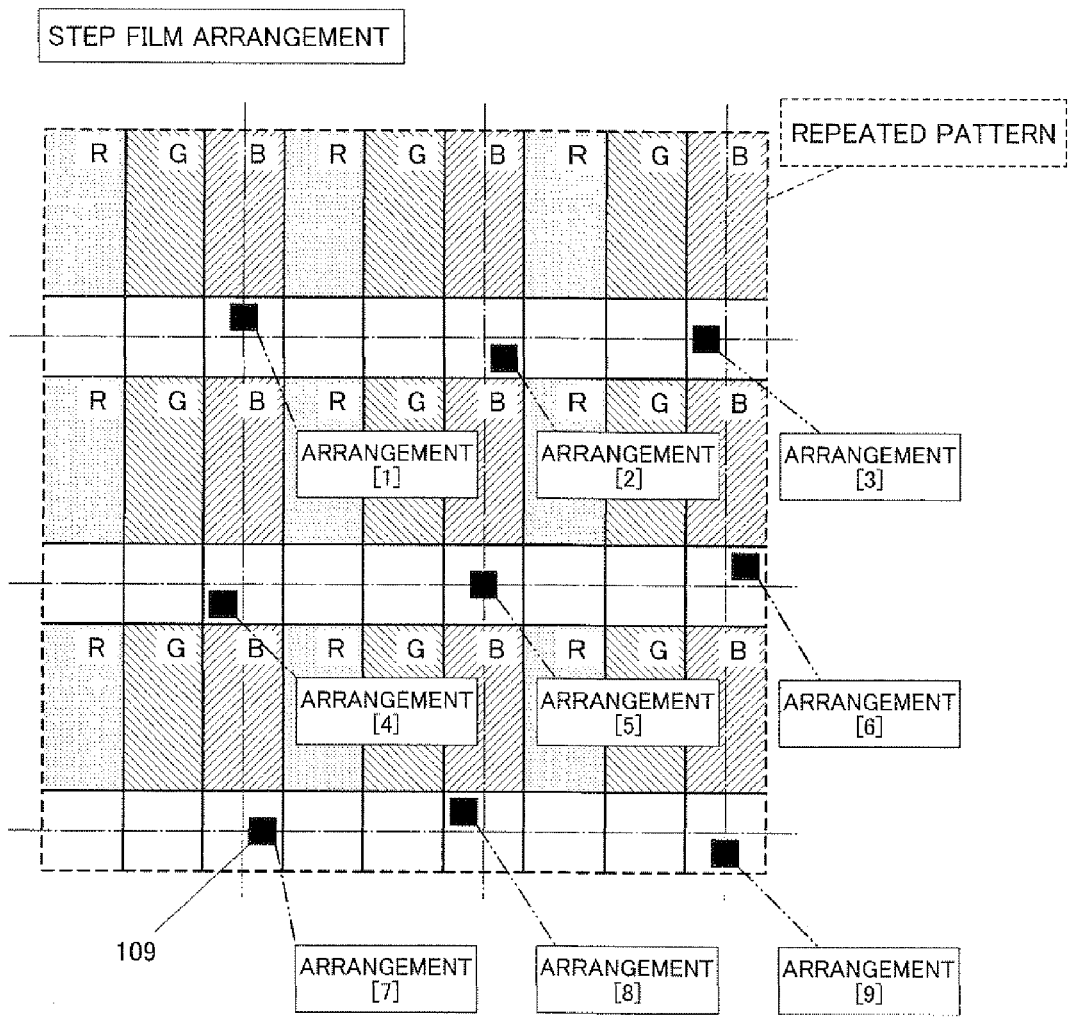
FIG. 10B is a schematic diagram showing the repeat pattern of step films of the sixth exemplary embodiment of the present invention.

FIG. 10B indicates the repeat pattern of the step film of a TFT substrate of this exemplary embodiment. In this exemplary embodiment, the step film 109 formed onto the TFT substrate 100 is arranged in all positions facing the columnar spacer 205 like the third exemplary embodiment.

In this exemplary embodiment, the central coordinate of the step film 109 and the central coordinate of the columnar spacer 205a corresponding to the step film 109 is designed such that they are different coordinates in at least eight positions arranged in a area of 3 pixels×3 pixels like the third exemplary embodiment. The step film 109 formed onto the TFT substrate 100 is arranged in the whole panel surface repeatedly making this area of 3 pixels×3 pixels one unit.

The shift state of the XY coordinate of each of arrangement [1]-[9] of the corresponding step film 109 when the central coordinate of the columnar spacer 205 is taken as the reference is indicated in the table of FIG. 10B. Here, it is made "a"=5 μm and "b"=5 μm.

In this exemplary embodiment, there are nine points where a columnar spacer and a step film are facing each other in a range of 3 pixels×3 pixels like the third exemplary embodiment. In addition, the central coordinate of a step film is designed such that it is shifted by 5 µm in one side for both the x-direction and the y-direction with standard deviation σ of 4.3 µm taking the central coordinate of a columnar spacer as the reference. The arrangement pitch of a step film changes repeatedly and periodically in both the x-direction and the y-direction in units of 3 pixels. Here, the arrangement pitch of a step film is designed such that it changes in the range of plus/minus 5 µm (a 10 µm range) from the arrangement pitch of a columnar spacer which is the reference.

This exemplary embodiment is different from the third exemplary embodiment in the point that it is designed such that the grid pitch of total of nine step films is arranged randomly in the range of a repeated unit of 3 pixels×3 pixels. Thus, step films are designed such that they are not arranged on a straight line. Even in case of such structure, the same effect as the second exemplary embodiment can be obtained. A liquid crystal display device of this exemplary embodiment can be produced using the same process as the second exemplary embodiment.

The Seventh Exemplary Embodiment

Figure 11A:
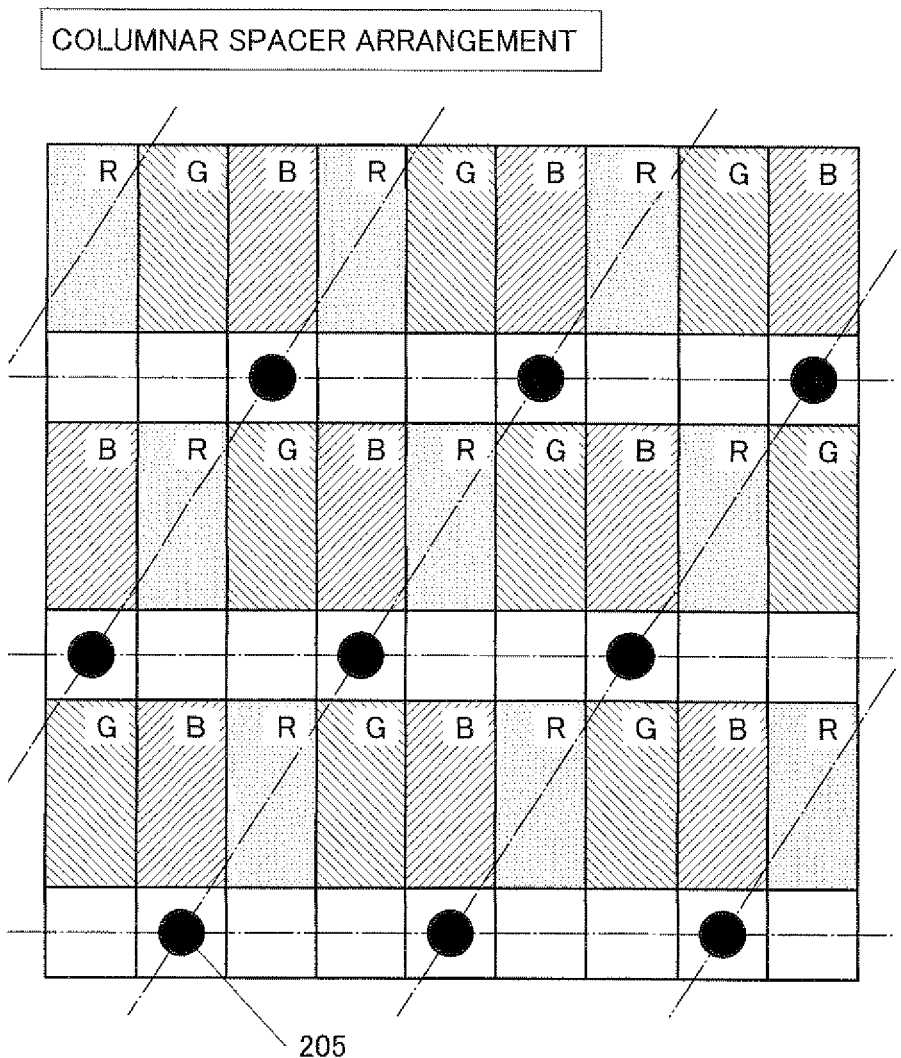
FIG. 11A is a schematic diagram showing the repeat pattern of columnar spacers of a seventh exemplary embodiment of the present invention.

Next, a liquid crystal display device according to the seventh exemplary embodiment of the present invention will be described. FIGS. 11A, B are schematic illustrations showing the repeat patterns of a columnar spacer and a step film of this exemplary embodiment.

The arrangement positional relationship between a convex step film 109 and a columnar spacer 205 in this exemplary embodiment will be described using FIGS. 11A, B.

FIG. 11A indicates the columnar spacer arrangement of a counter substrate of this exemplary embodiment. In this exemplary embodiment, the columnar spacer 205 placed in the counter substrate 200 side is arranged on the BM 202 corresponding to every point of the blue color layer. In addition, this exemplary embodiment is different from the third exemplary embodiment in a point that a color filter is a mosaic arrangement type color filter.

Figure 11B:
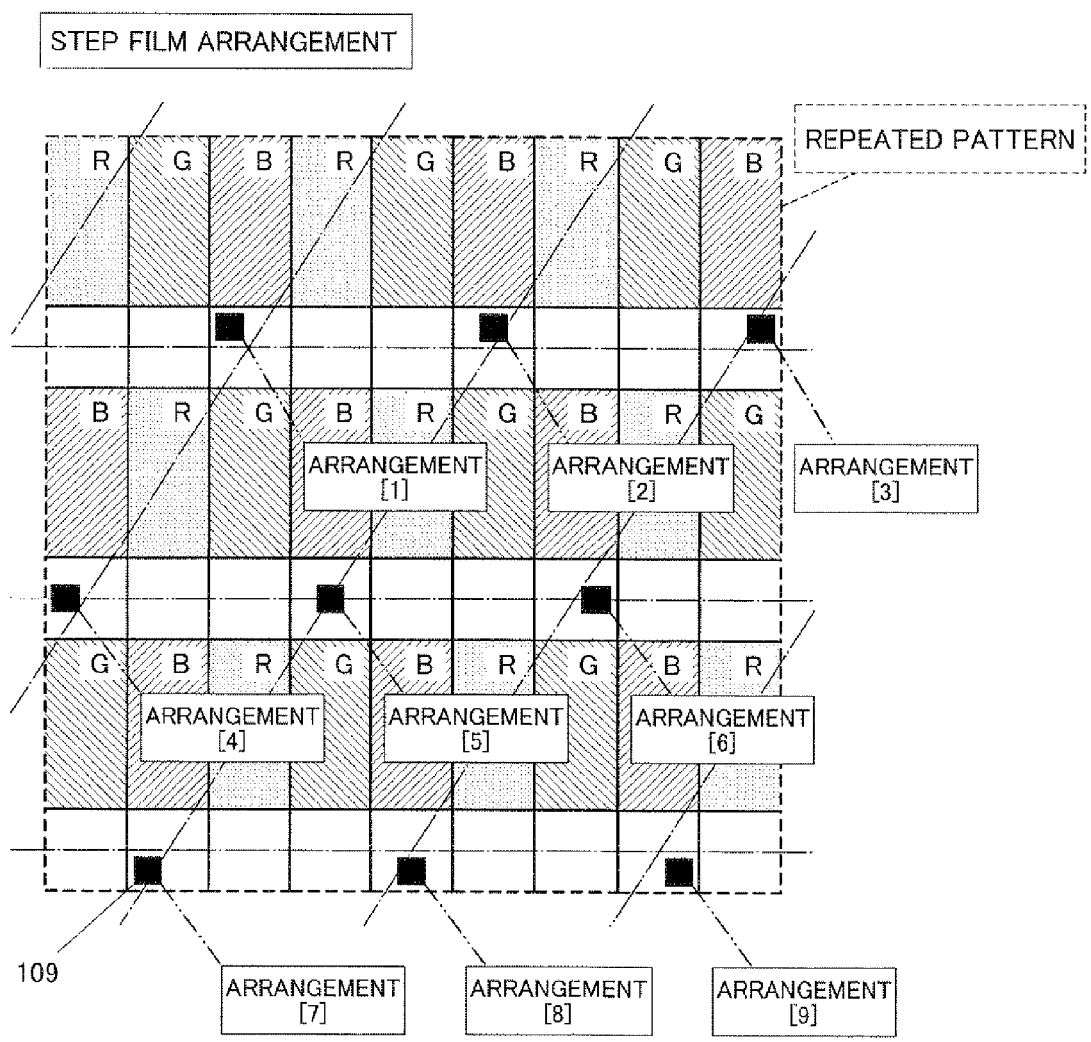
FIG. 11B is a schematic diagram showing the repeat pattern of step films of the seventh exemplary embodiment of the present invention.

FIG. 11B indicates the repeat pattern of the step film of a TFT substrate of this exemplary embodiment. The step film 109 formed onto the TFT substrate 100 is arranged in all positions facing the columnar spacer 205.

Here, the central coordinate of the step film 109 and the central coordinate of the columnar spacer 205a corresponding to the step film 109 is designed such that they are different coordinates in at least eight positions among neighboring nine positions. The step film 109 formed onto the TFT substrate 100 is arranged in the whole panel surface repeatedly making this area of 9 pixels one unit.

The shift state of the XY coordinate of each of arrangement [1]-[9] of the corresponding step film 109 when the central coordinate of the columnar spacer 205 is taken as the reference is indicated in the table of FIG. 11B. Here, it is made "a"=5 µm and "b"=5 µm.

In this exemplary embodiment, the central coordinate of a step film is formed such that it is shifted by 5 µm in one side for both the x-direction and the y-direction with standard deviation σ of 4.3 µm taking the central coordinate of a columnar spacer as the reference like the second exemplary embodiment. The arrangement pitch of a step film changes repeatedly and periodically in both the x-direction and the y-direction. Here, the arrangement pitch of a step film is designed such that it changes in the range of plus/minus 5 µm (a 10 µm range) from the arrangement pitch of a columnar spacer which is the reference.

As shown in this exemplary embodiment, even in a case of a color filter of a mosaic arrangement, the same effect as the second exemplary embodiment can be obtained irrespective of arrangement of a color filter. A liquid crystal display device of this exemplary embodiment can be produced using the same process as the second exemplary embodiment.

The Eighth Exemplary Embodiment

Figure 12A:
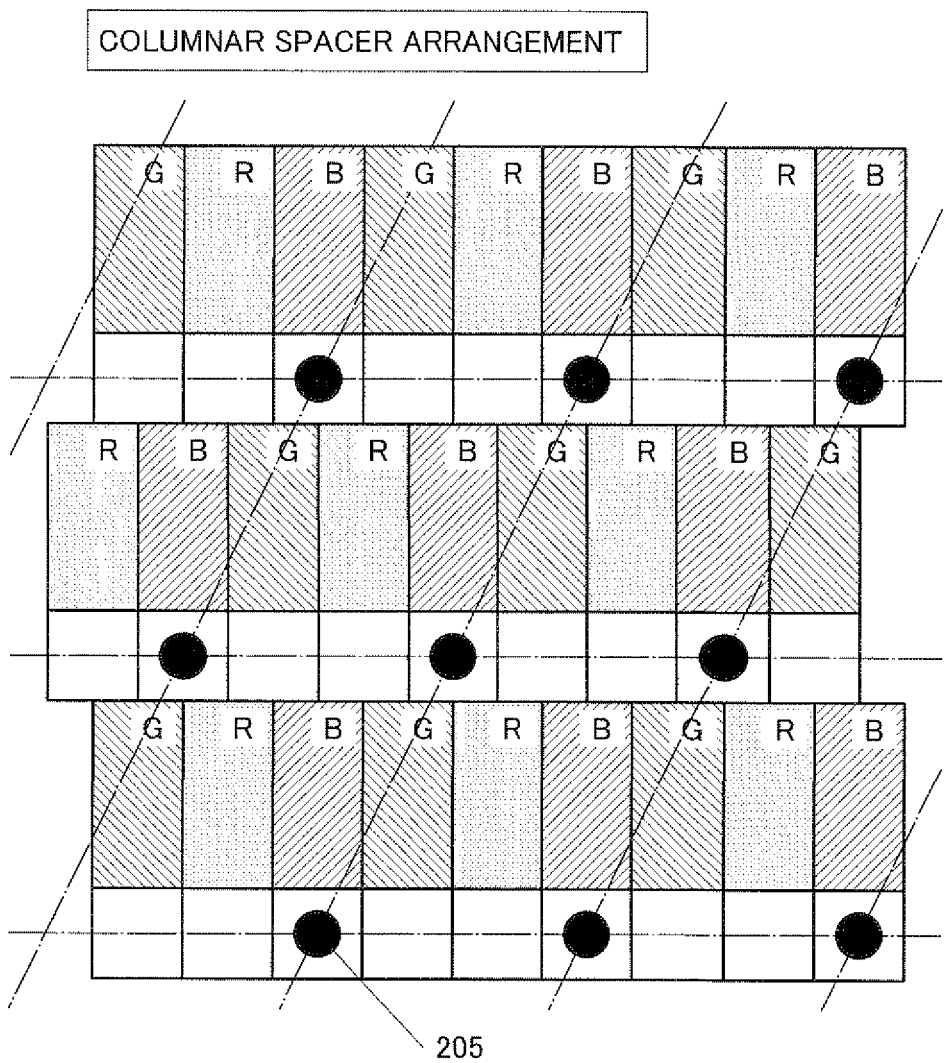
FIG. 12A is a schematic diagram showing the repeat pattern of columnar spacers of an eighth exemplary embodiment of the present invention.

Next, a liquid crystal display device according to the eighth exemplary embodiment of the present invention will be described. FIGS. 12A, B are schematic illustrations showing the repeat patterns of a columnar spacer and a step film of this exemplary embodiment.

The arrangement positional relationship between a convex step film 109 and a columnar spacer 205 in this exemplary embodiment will be described using FIGS. 12A, B.

FIG. 12A indicates the columnar spacer arrangement of a counter substrate of this exemplary embodiment. In this exemplary embodiment, the columnar spacer 205 placed in the counter substrate 200 side is arranged on the BM 202 corresponding to every point of the blue color layer. In addition, this exemplary embodiment is different from the third exemplary embodiment in a point that a color filter is a delta arrangement type color filter.

Figure 12B:
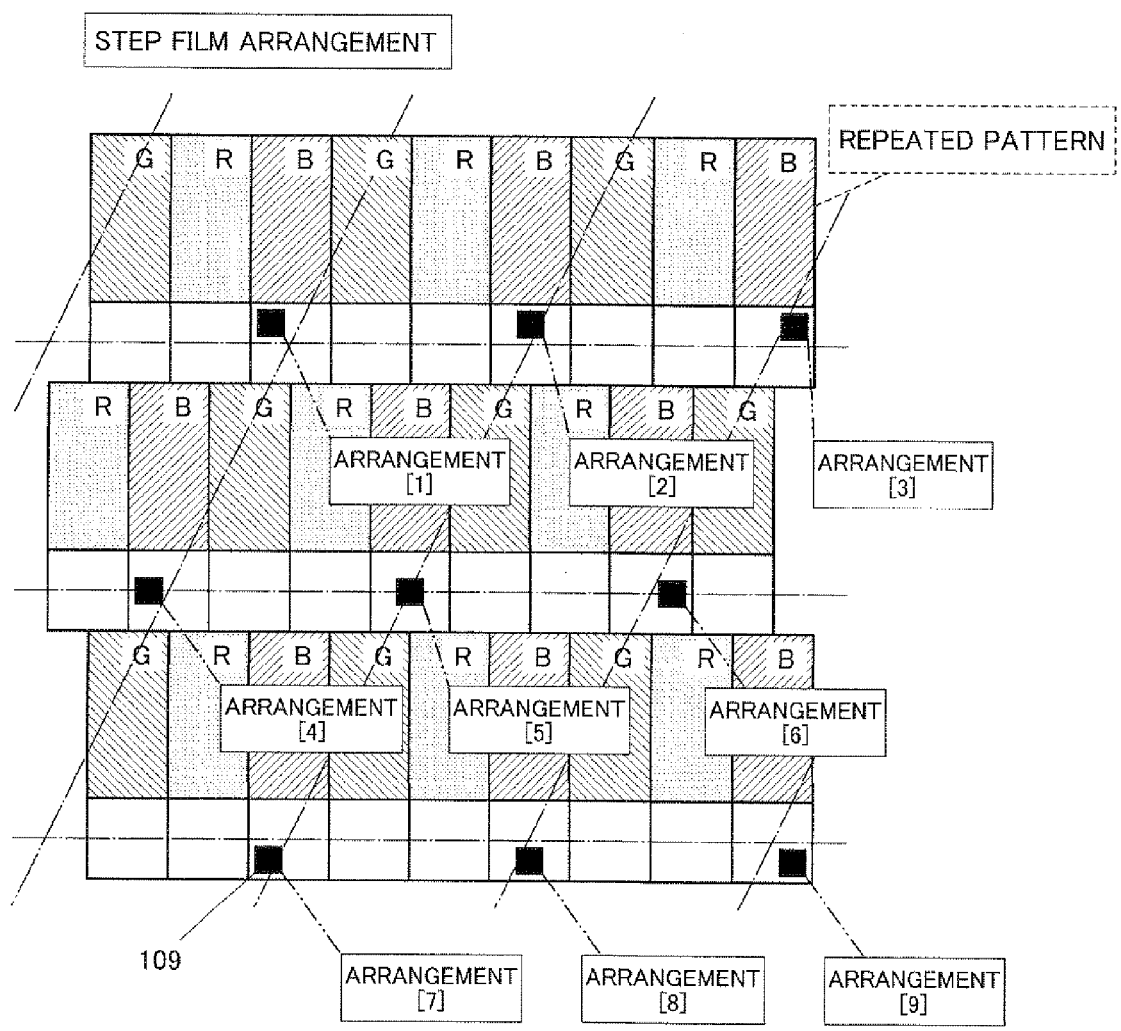
FIG. 12B is a schematic diagram showing the repeat pattern of step films of the eighth exemplary embodiment of the present invention.

FIG. 12B indicates the repeat pattern of the step film of a TFT substrate of this exemplary embodiment. The step film 109 formed onto the TFT substrate 100 is arranged in all positions facing the columnar spacer 205.

Here, the central coordinate of the step film 109 and the central coordinate of the columnar spacer 205a corresponding to the step film 109 is designed such that they are different coordinates in at least eight positions among neighboring nine positions. The step film 109 formed onto the TFT substrate 100 is arranged in the whole panel surface repeatedly making this area of neighboring 9 pixels one unit.

The shift state of the XY coordinate of each of arrangement [1]-[9] of the corresponding step film 109 when the central coordinate of the columnar spacer 205 is taken as the reference is indicated in the table of FIG. 12B. Here, it is made "a"=5 µm and "b"=5 µm.

In this exemplary embodiment, the central coordinate of a step film is formed such that it is shifted by 5 µm in one side for both the x-direction and the y-direction with standard deviation σ of 4.3 µm taking the central coordinate of a columnar spacer as the reference like the second exemplary embodiment. The arrangement pitch of a step film changes repeatedly and periodically in both the x-direction and the y-direction. Here, the arrangement pitch of a step film is designed such that it changes in the range of plus/minus 5 µm (a 10 µm range) from the arrangement pitch of a columnar spacer which is the reference.

As shown in this exemplary embodiment, even in a case of a color filter of a delta arrangement, the same effect as the second exemplary embodiment can be obtained irrespective of arrangement of a color filter. A liquid crystal display device of this exemplary embodiment can be produced using the same process as the second exemplary embodiment.

The Ninth Exemplary Embodiment

Figure 13A:
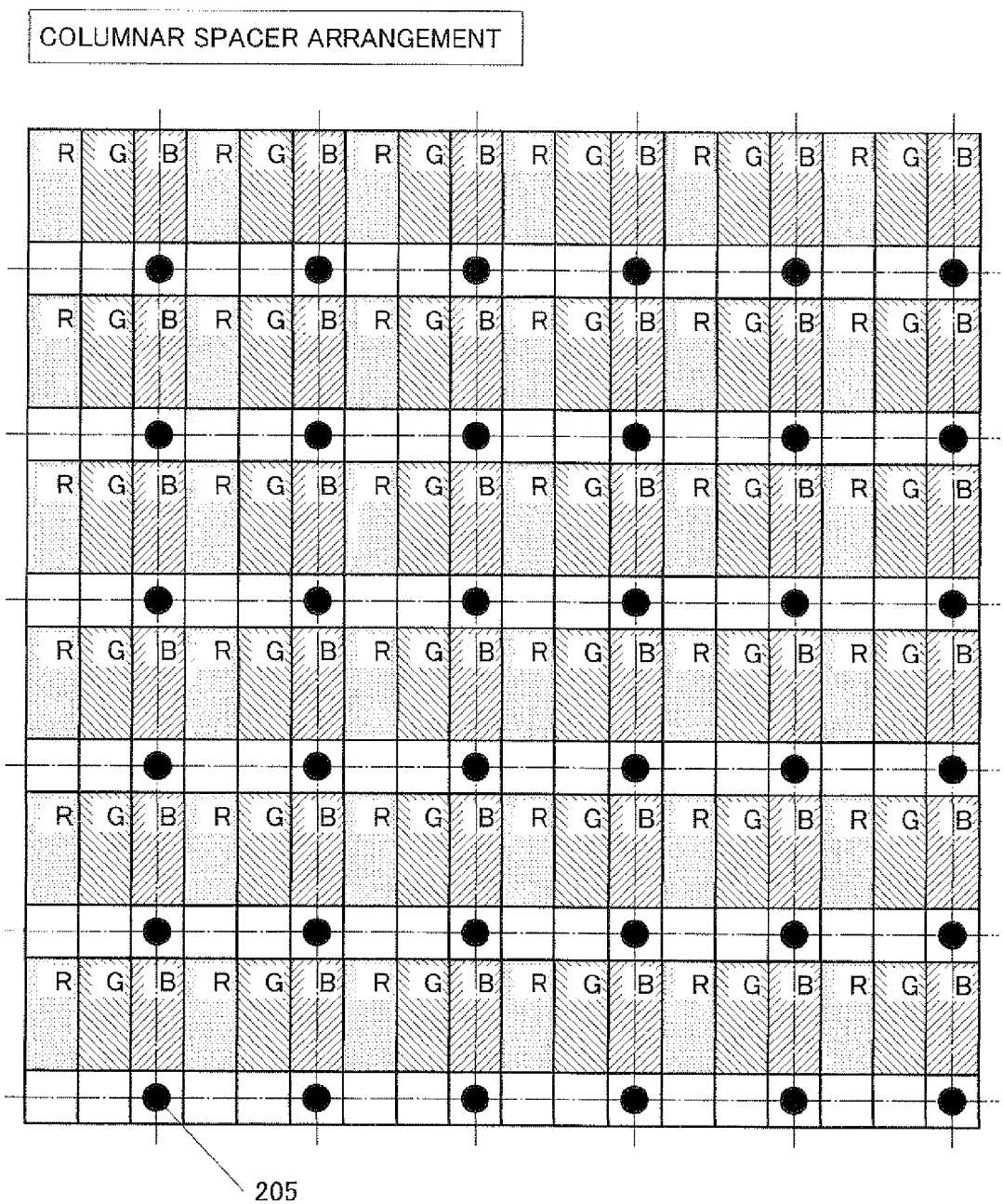
FIG. 13A is a schematic diagram showing the repeat pattern of columnar spacers of a ninth exemplary embodiment of the present invention.

Next, a liquid crystal display device according to the ninth exemplary embodiment of the present invention will be described. FIGS. 13A, B are schematic illustrations showing the repeat patterns of a columnar spacer and a step film of this exemplary embodiment.

The arrangement positional relationship between a convex step film 109 and a columnar spacer 205 in this exemplary embodiment will be described using FIGS. 13A, B.

FIG. 13A indicates the columnar spacer arrangement formed onto a counter substrate of this exemplary embodiment, which is similar to the columnar spacer arrangement on a counter substrate side of the third exemplary embodiment.

Figure 13B:
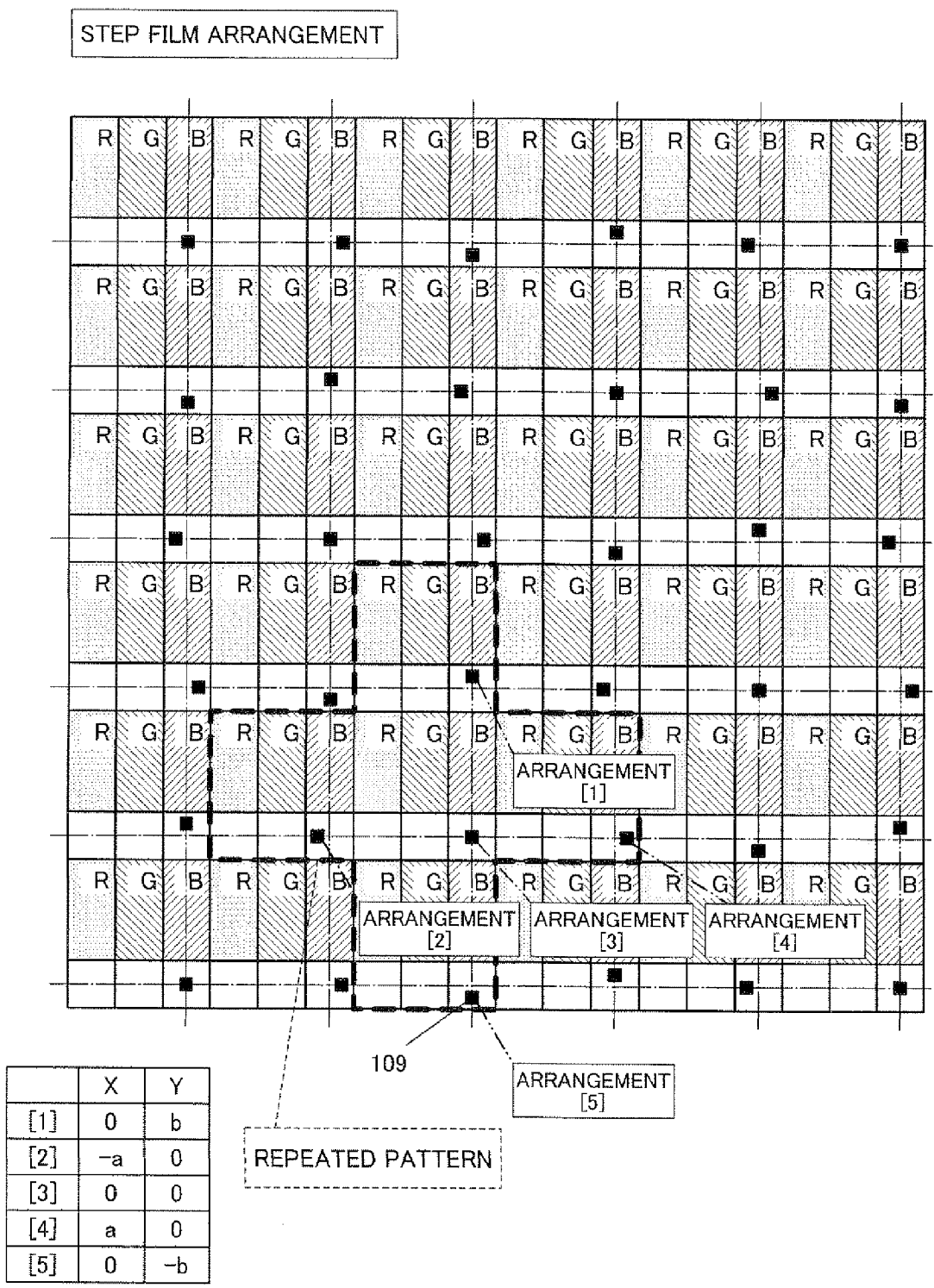
FIG. 13B is a schematic diagram showing the repeat pattern of step films of the ninth exemplary embodiment of the present invention.

FIG. 13B indicates the repeat pattern of the step film formed onto a TFT substrate of this exemplary embodiment. In this exemplary embodiment, the step film 109 formed onto the TFT substrate 100 is arranged in all positions facing the columnar spacer 205 like the third exemplary embodiment.

Here, the central coordinate of the step film 109 and the central coordinate of the columnar spacer 205a corresponding to the step film 109 is designed such that they are different coordinates in five positions neighboring on the left, right, top and bottom. The step film 109 formed onto the TFT substrate 100 is arranged in the whole panel surface repeatedly making an area of this 5 pixels one unit.

The shift state of the XY coordinate of each of arrangement [1]-[5] of the corresponding step film 109 when the central coordinate of the columnar spacer 205 is taken as the reference is indicated in the table of FIG. 13B. Here, it is made "a"=5 μm and "b"=5 μm.

There are five points where a columnar spacer and a step film corresponding to each other in the range of the neighboring five pixels. The central coordinate of a step film is formed such that it is shifted by 5 μm in one side for both the x-direction and the y-direction with standard deviation σ of 4.3 μm taking the central coordinate of a columnar spacer as the reference. The arrangement pitch of a step film changes repeatedly and periodically in both the x-direction and the y-direction. Here, the arrangement pitch of a step film is designed such that it changes in the range of plus/minus 5 μm (a 10 μm range) from the arrangement pitch of a columnar spacer which is the reference.

This exemplary embodiment is different from the third exemplary embodiment in a point that a repeated unit is designed such that it is arranged in a oblique direction repeatedly. Even in a case of such structure, the same effect as the second exemplary embodiment can be obtained. A liquid crystal display device of this exemplary embodiment can be produced using the same process as the second exemplary embodiment.

The Tenth Exemplary Embodiment

Figure 14A:
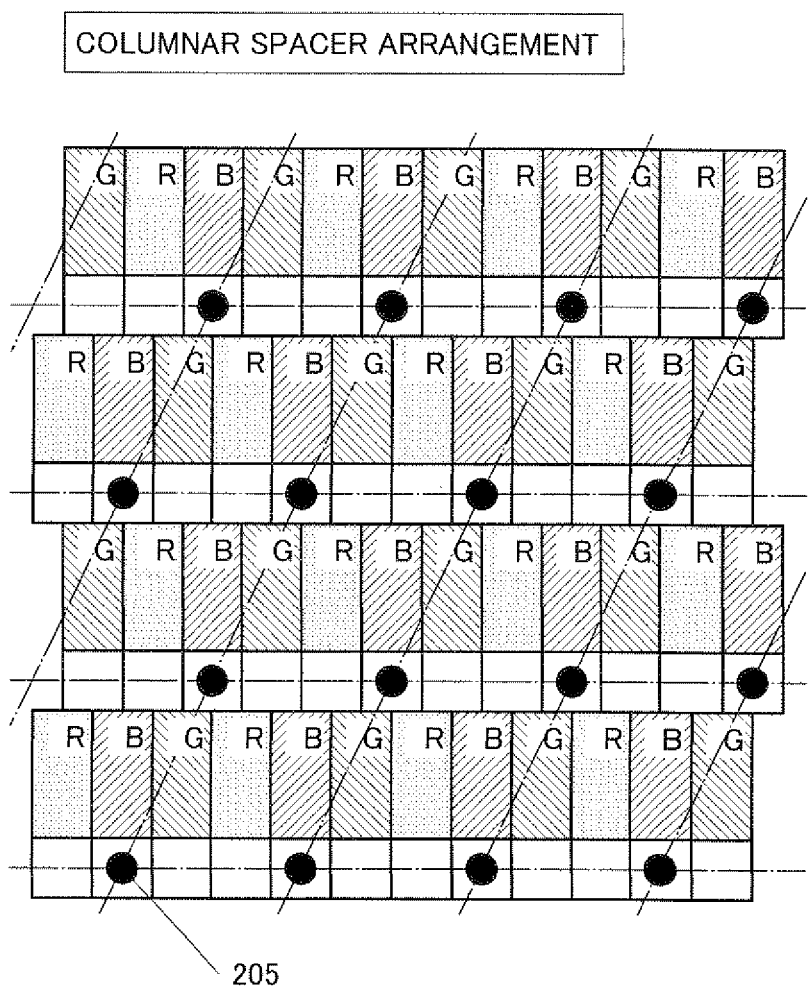
FIG. 14A is a schematic diagram showing the repeat pattern of columnar spacers of a tenth exemplary embodiment of the present invention.

Next, a liquid crystal display device according to the tenth exemplary embodiment of the present invention will be described. FIGS. 14A, B are schematic illustrations showing the repeat patterns of a columnar spacer and a step film of this exemplary embodiment.

The arrangement positional relationship between a convex step film 109 and a columnar spacer 205 in this exemplary embodiment will be described using FIGS. 14A, B.

FIG. 14A indicates the columnar spacer arrangement on the counter substrate side of this exemplary embodiment. In this exemplary embodiment, the columnar spacer 205 placed in the counter substrate 200 side is arranged on the BM 202 corresponding to every point of the blue color layer. In contrast to the third exemplary embodiment, a color filter is a delta arrangement type color filter in this exemplary embodiment.

Figure 14B:
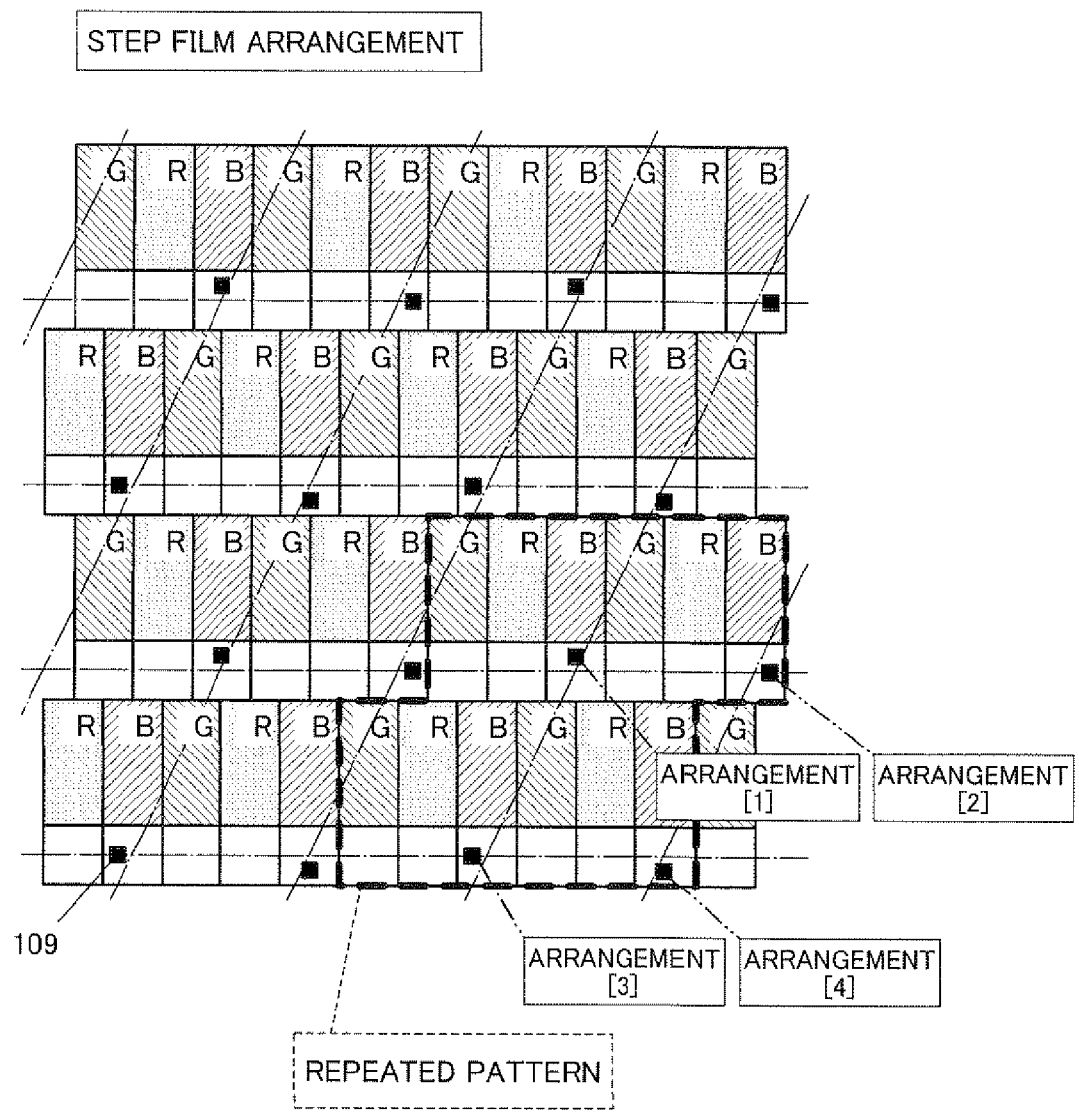
FIG. 14B is a schematic diagram showing the repeat pattern of step films of the tenth exemplary embodiment of the present invention.

FIG. 14B indicates the repeat pattern of the step film formed onto a TFT substrate of this exemplary embodiment. The step film 109 formed onto the TFT substrate 100 is arranged in all positions facing the columnar spacer 205.

Here, the central coordinate of the step film 109 and the central coordinate of the columnar spacer 205a corresponding to the step film 109 is designed such that they are different coordinates in neighboring four positions. The step film 109 formed onto the TFT substrate 100 is arranged in the whole panel surface repeatedly making an area of this 4 pixels one unit.

The shift state of the XY coordinate of each of arrangement [1]-[4] of the corresponding step film 109 when the central coordinate of the columnar spacer 205 is taken as the reference is indicated in the table of FIG. 14B. Here, it is made "a"=5 μm and "b"=5 μm.

There are four points where a columnar spacer and a step film corresponding to each other in the range of the neighboring four pixels. The central coordinate of a step film is formed such that it is shifted by 5 μm in one side for both the x-direction and the y-direction with standard deviation σ of 4.3 μm taking the central coordinate of a columnar spacer as the reference. The arrangement pitch of a step film changes repeatedly and periodically in both the x-direction and the y-direction in units of 4 pixels. Here, the arrangement pitch of a step film is designed such that it changes in the range of plus/minus 5 μm (a 10 μm range) from the arrangement pitch of a columnar spacer which is the reference.

As shown in this exemplary embodiment, even in a case of a repeat arrangement unit of neighboring 4 pixels, the same effect as the second exemplary embodiment can be obtained. A liquid crystal display device of this exemplary embodiment can be produced using the same process as the second exemplary embodiment.

The Eleventh Exemplary Embodiment

Figure 15A:
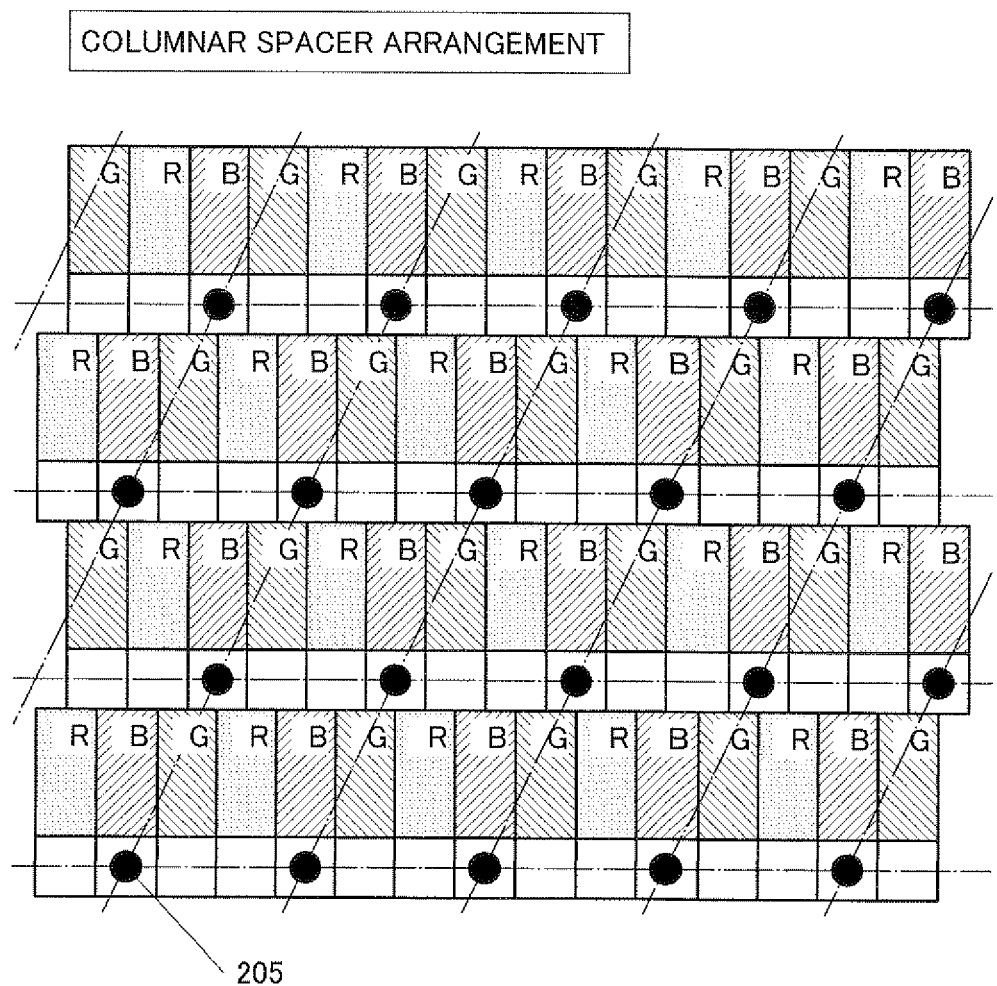
FIG. 15A is a schematic diagram showing the repeat pattern of columnar spacers of an eleventh exemplary embodiment of the present invention.

Next, a liquid crystal display device according to the eleventh exemplary embodiment of the present invention will be described. FIGS. 15A, B are schematic illustrations showing the repeat patterns of a columnar spacer and a step film of this exemplary embodiment.

The arrangement positional relationship between a convex step film 109 and a columnar spacer 205 in this exemplary embodiment will be described using FIGS. 15A, B.

FIG. 15A indicates the columnar spacer arrangement on the counter substrate side of this exemplary embodiment. This is similar to the columnar spacer arrangement on the counter substrate side of the tenth exemplary embodiment.

Figure 15B:
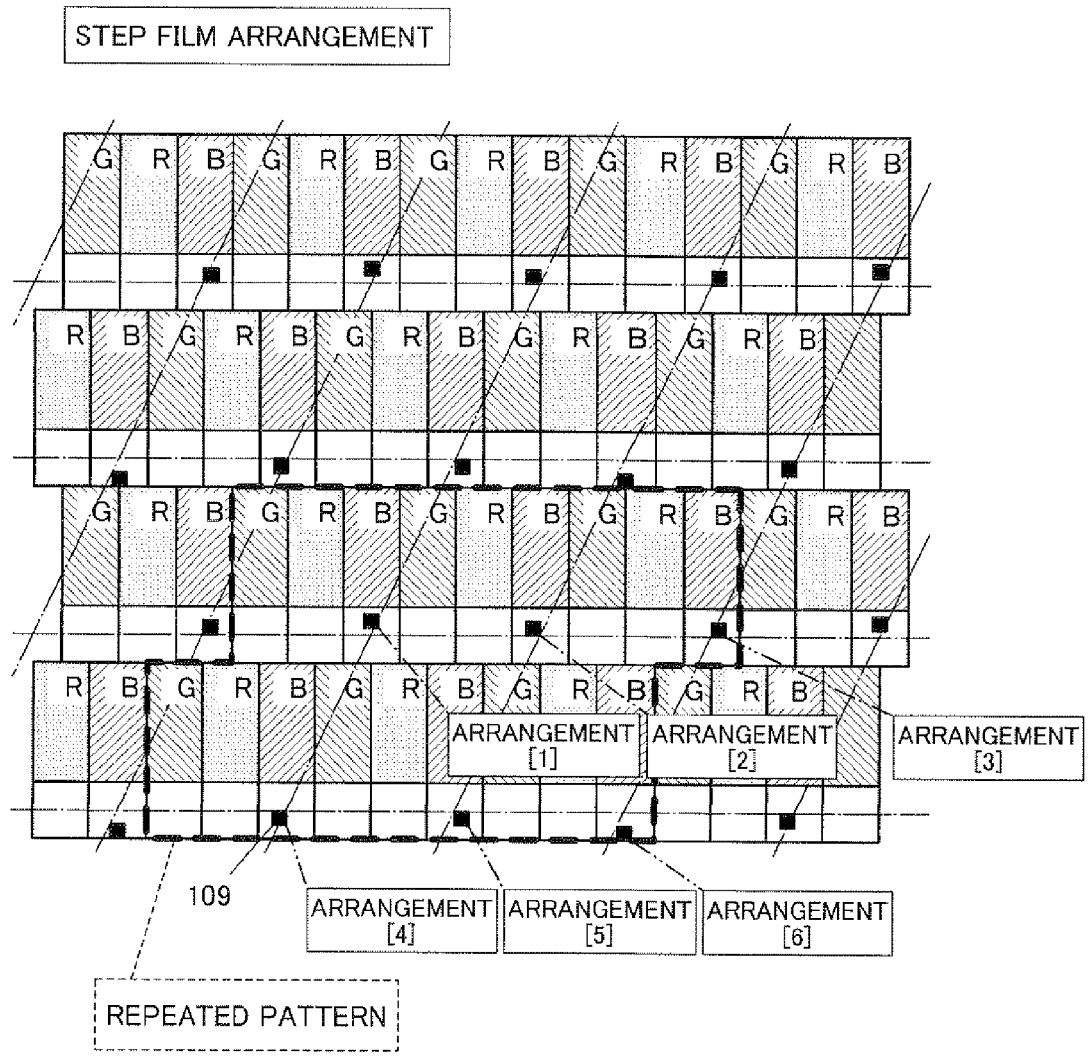
FIG. 15B is a schematic diagram showing the repeat pattern of step films of the eleventh exemplary embodiment of the present invention.

FIG. 15B indicates the repeat pattern of the step film formed onto a TFT substrate of this exemplary embodiment. The step film 109 formed onto the TFT substrate 100 is arranged in all positions facing the columnar spacer 205.

Here, the central coordinate of the step film 109 and the central coordinate of the columnar spacer 205a corresponding to the step film 109 is designed such that they are different coordinates in neighboring six positions. The step film 109 formed onto the TFT substrate 100 is arranged in the whole panel surface repeatedly making an area of this 6 pixels one unit.

The shift state of the XY coordinate of each of arrangement [1]-[6] of the corresponding step film 109 when the central coordinate of the columnar spacer 205 is taken as the reference is indicated in the table of FIG. 15B. Here, it is made "b"=5 μm, "c"=4.3 μm and "d"=2.5 μm.

In this exemplary embodiment, there are six points where a columnar spacer and a step film corresponding to each other in the range of the neighboring six pixels. The central coordinate of a step film is formed such that it is shifted by 5 μm in one side for both the x-direction and the y-direction with standard deviation σ of 4.3 μm taking the central coordinate of a columnar spacer as the reference. The arrangement pitch of a step film changes repeatedly and periodically in both the x-direction and the y-direction. Here, the arrangement pitch of a step film is designed such that it changes in the range of plus/minus 5 µm (a 10 µm range) from the arrangement pitch of a columnar spacer which is the reference.

That is, in this exemplary embodiment, the structure is such that two repeat patterns each including neighboring three pixels are lined side by side with one of them being turned upside down. Even in a case of a repeat arrangement unit of neighboring six pixels, the same effect as the second exemplary embodiment can be obtained. A liquid crystal display device of this exemplary embodiment can be produced using the same process as the second exemplary embodiment.

The Twelfth Exemplary Embodiment

Next, a liquid crystal display device according to the twelfth exemplary embodiment of the present invention will be described.

A liquid crystal display device in this exemplary embodiment has the TFT substrate 100, the step film 109, the counter substrate 200, the columnar spacer 205 and the liquid crystal 206 like the first exemplary embodiment.

Here, in this exemplary embodiment, a difference between positions of the central coordinate of the step film 109 and the central coordinate of the columnar spacer 205 seen in the normal direction of the display surface of the liquid crystal display device may be designed such that it varies with standard deviation σ of no smaller than 3 µm in at least one direction within a 10 mm square range in the display area of the display surface.

When described using an arrangement pitch of a step film and a columnar spacer, it is as follows. That is, the arrangement pitch of at least one of a step film and a columnar spacer may be designed such that it varies with standard deviation σ of no smaller than 3 µm in at least one direction within a 10 mm square range in the display area of the display surface of the liquid crystal display device.

Alternatively, the arrangement pitch of at least one of a step film and a columnar spacer may be designed such that it varies with standard deviation σ of no smaller than 3 µm in at least one direction within a 10 mm square range in the display area of the display surface of the liquid crystal display device.

As a result, even if a misalignment occurs between the TFT substrate 100 and the counter substrate 200 and if the shape of the columnar spacer 205 varies, occurrence of nonuniformity of a cell gap can be suppressed.

Without being limited to the first to twelfth exemplary embodiment mentioned above, the present invention is applicable in every kind of devices when it is a liquid crystal display device in which a cell gap is formed by a columnar spacer and a step film.

An effect of the present invention is, for example, that even if a stacking misalignment occurs between a TFT substrate and a counter substrate and if the shape of a columnar spacer varies, occurrence of nonuniformity of a cell gap can be suppressed. The reason why this effect is obtained will be described. Generally, the tip part of the columnar spacer 205 is not perfectly flat. Therefore, usually, when a stack misalignment or the like between a TFT substrate and a counter substrate is caused, a coordinate in which a columnar spacer and a step film make contact with each other changes. As a result, a change occurs in a cell gap. On the other hand, in a liquid crystal display device of the present invention, there are a plurality of relative positions between the central coordinate of a columnar spacer and the central coordinate of a corresponding step film. When a TFT substrate and a counter substrate are stacked within a stacking specification, the highest position of a columnar spacer and a step film make contact with each other in at least one of the plurality of relative positions. As a result, uniformity of a cell gap is always kept constant.

Another effect of the present invention is that a high aperture ratio and high display quality can be achieved, for example. The reason why this effect is obtained will be described. In the second exemplary embodiment, for example, a step film is designed so that the size of at least one direction may be smaller than a columnar spacer formed on the counter substrate side. As a result, a gate line and a COM wiring in the neighborhood can be densely arranged in a design process, enabling high-aperture-ratio design. When the tip of the columnar spacer 205 is not flat, if the step film 109 is made smaller than the columnar spacer 205, it is necessary generally to design the columnar spacer 205 large taking account of an area where the shape of the tip of the columnar spacer 205 becomes unstable. The reason of this is that, when a stacking misalignment occurs, the contact position of a step film and the tip part of a columnar spacer 205 varies in the panel surface, causing nonuniformity of a cell gap. Therefore, an aperture ratio becomes small. However, in a structure of the present invention, as mentioned above, the tip part of a columnar spacer with which a step film is in contact does not have to be flat necessarily. Therefore, nonuniformity of a gap does not occur even in a high aperture design.

The previous description of embodiments is provided to enable a person skilled in the art to make and use the present invention. Moreover, various modifications to these exemplary embodiments will be readily apparent to those skilled in the art, and the generic principles and specific examples defined herein may be applied to other embodiments without the use of inventive faculty. Therefore, the present invention is not intended to be limited to the exemplary embodiments described herein but is to be accorded the widest scope as defined by the limitations of the claims and equivalents.

Further, it is noted that the inventor's intent is to retain all equivalents of the claimed invention even if the claims are amended during prosecution.

The invention claimed is:

1. A liquid crystal display device, comprising:
   a TFT substrate;
   a counter substrate;
   more than one columnar spacer formed on the counter substrate side;
   a step film of convex shape formed onto the TFT substrate side and arranged at a position facing the columnar spacer; and
   a liquid crystal sealed between the TFT substrate and the counter substrate, wherein
   a difference between a central coordinate of the step film and a central coordinate of each of the more than one columnar spacers seen in a normal direction of a display surface of the liquid crystal display device varies with standard deviation σ of no smaller than 3 µm in at least one direction within an appropriate range in a display area of the display surface.

2. A liquid crystal display device according to claim 1 wherein the appropriate range is of a range of no larger than 10 mm square.

3. A liquid crystal display device according to claim 1 wherein a size of the step film is smaller than the columnar spacer in at least one direction when seen in the normal direction of the display surface.

4. A liquid crystal display device according to claim 1 wherein at least one of the step film and the columnar spacer is positioned such that its coordinates are shifted from an appropriate grid.

5. A liquid crystal display device according to claim 1 wherein at least one of the step film and the columnar spacer is repeated in one-dimension so as to form a periodic pattern.

6. A liquid crystal display device according to claim 1 wherein at least one of the step film and the columnar spacer is repeated in two-dimensions so as to form a periodic pattern.

7. A liquid crystal display device according to claim 1, wherein the step film is smaller than the columnar spacer in at least one direction when seen in a normal direction of the display surface, and wherein,
when a width of the step film which is smaller than the columnar spacer is W1, a width of the columnar spacer in a same direction as the width of the step film W1 is W2, and a maximum value and a minimum value of a positional shift between a coordinate of a center of the step film and a coordinate of a center of the columnar spacer are D1 and D2 respectively, the following relational expression $$D1-D2 \leq W2-W1$$

is satisfied.

8. A liquid crystal display device according to claim 1 wherein the columnar spacer comprises: a first columnar spacer that is arranged in a position facing the step film; and a second columnar spacer arranged in a position without the step film.

9. A liquid crystal display device, comprising:
a TFT substrate;
a counter substrate;
more than one columnar spacer formed on the counter substrate side;
more than one step film of a convex shape formed onto the TFT substrate side and arranged at a position facing the columnar spacer; and
a liquid crystal sealed between the TFT substrate and the counter substrate, wherein
an arrangement pitch of at least one of the step film and the columnar spacer varies with standard deviation σ of no smaller than 3 μm in at least one direction within an appropriate range in a display area of a display surface of the liquid crystal display device.

10. A liquid crystal display device according to claim 9 wherein the appropriate range is of a range of no larger than 10 mm square.

11. A liquid crystal display device according to claim 9 wherein a size of the step film is smaller than the columnar spacer in at least one direction when seen in a normal direction of the display surface.

12. A liquid crystal display device according to claim 9 wherein an arrangement pitch of at least one of the step film and the columnar spacer changes periodically and repeatedly.

13. A liquid crystal display device according to claim 9 wherein an arrangement pitch of at least one of the step film and the columnar spacer changes periodically and repeatedly in both a x-direction and a y-direction.

14. A liquid crystal display device according to claim 9 wherein an arrangement pitch of at least one of the step film and the columnar spacer changes periodically and repeatedly in one of a x-direction and a y-direction.

15. A liquid crystal display device according to claim 9 wherein difference between an arrangement pitch of the step film and an arrangement pitch of the columnar spacer changes periodically and repeatedly.

16. A liquid crystal display device according to claim 9, wherein the step film is smaller than the columnar spacer in at least one direction when seen in a normal direction of the display surface, and wherein,
when a width of the step film which is smaller than the columnar spacer is W1, a width of the columnar spacer in a same direction as the width of the step film W1 is W2, and a maximum value and a minimum value of a positional shift between a coordinate of a center of the step film and a coordinate of a center of the columnar spacer are D1 and D2 respectively, the following relational expression $$D1-D2 \leq W2-W1$$

is satisfied.

17. A liquid crystal display device according to claim 9 wherein the columnar spacer comprises: a first columnar spacer that is arranged in a position facing the step film; and a second columnar spacer arranged in a position without the step film.

18. A liquid crystal display device, comprising:
a TFT substrate;
a counter substrate;
more than one columnar spacer formed on the counter substrate side;
more than one step film of a convex shape formed onto the TFT substrate side and arranged at a position facing the columnar spacer; and
a liquid crystal sealed between the TFT substrate and the counter substrate, wherein
arrangement of at least one of the step film and the columnar spacer varies with standard deviation σ of no smaller than 3 μm in the direction perpendicular to an appropriate line in at least one direction within an appropriate range in a display area of a display surface of the liquid crystal display device.

19. A liquid crystal display device according to claim 18 wherein the appropriate range is of a range of no larger than 10 mm square.

20. A liquid crystal display device according to claim 18 wherein a size of the step film is smaller than the columnar spacer in at least one direction when seen in a normal direction of the display surface.

21. A liquid crystal display device according to claim 18 wherein arrangement of at least one of the step film and the columnar spacer changes periodically and repeatedly.

22. A liquid crystal display device according to claim 18 wherein arrangement of at least one of the step film and the columnar spacer changes periodically and repeatedly in both a x-direction and a y-direction.

23. A liquid crystal display device according to claim 18, wherein the step film is smaller than the columnar spacer in at least one direction when seen in a normal direction of the display surface, and wherein,
when a width of the step film which is smaller than the columnar spacer is W1, a width of the columnar spacer in a same direction as the width of the step film W1 is W2, and a maximum value and a minimum value of a positional shift between a coordinate of a center of the step film and a coordinate of a center of the columnar spacer are D1 and D2 respectively, the following relational expression $$D1-D2 \leq W2-W1$$

is satisfied.

24. A liquid crystal display device according to claim 18 wherein the columnar spacer comprises: a first columnar spacer that is arranged in a position facing a step film; and a second columnar spacer arranged in a position without a step film.

* * * * *